United States Patent
Ibukuro et al.

(10) Patent No.: US 6,573,985 B2
(45) Date of Patent: Jun. 3, 2003

(54) WAVELENGTH DISPERSION MEASURING DEVICE AND A METHOD THEREOF

(75) Inventors: Sadao Ibukuro, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 09/791,847

(22) Filed: Feb. 26, 2001

(65) Prior Publication Data

US 2002/0018213 A1 Feb. 14, 2002

(30) Foreign Application Priority Data

Aug. 9, 2000 (JP) ........................................ 2000-240594

(51) Int. Cl.[7] ............................................. G01N 21/00
(52) U.S. Cl. ...................... 356/73.1; 356/484; 356/487; 385/123
(58) Field of Search ........................ 356/73.1, 484–488, 356/123

(56) References Cited

U.S. PATENT DOCUMENTS

| | | | | |
|---|---|---|---|---|
| 4,856,899 A | * | 8/1989 | Iwaoka et al. ............... 356/454 |
| 4,984,884 A | * | 1/1991 | Ryu et al. ................... 356/73.1 |
| 5,298,962 A | * | 3/1994 | Nourrcier ................... 356/5.09 |
| 5,406,368 A | * | 4/1995 | Horiuchi et al. ............ 356/73.1 |
| 5,956,131 A | * | 9/1999 | Mamyshev et al. ......... 356/73.1 |
| 5,969,806 A | * | 10/1999 | Bergano ..................... 356/73.1 |
| 5,995,228 A | * | 11/1999 | Otani et al. ................. 356/364 |
| 6,091,535 A | * | 7/2000 | Satoh .......................... 359/239 |
| 6,154,273 A | * | 11/2000 | Suzuki ....................... 356/73.1 |
| 6,362,874 B1 | * | 3/2002 | Madsen ..................... 356/73.1 |
| 6,388,785 B2 | * | 5/2002 | Havstad et al. ............. 359/161 |
| 6,407,805 B1 | * | 6/2002 | Sorin ......................... 356/73.1 |

FOREIGN PATENT DOCUMENTS

| | | |
|---|---|---|
| JP | A-59-157524 | 9/1984 |
| JP | A-60-127430 | 7/1985 |
| JP | A-62-15430 | 1/1987 |
| JP | A-62-42023 | 2/1987 |
| JP | A-07-113722 | 5/1995 |
| JP | A-2000-019068 | 1/2000 |

OTHER PUBLICATIONS

M. Shirasaki, et al., "Dispersion Compensation Using the Virtually Imaged Phased Array", Proceedings APCC/OECC '99, pgs. 1367–1370, Oct. 18, 1999.

* cited by examiner

Primary Examiner—Robert H. Kim
Assistant Examiner—Allen C. Ho
(74) Attorney, Agent, or Firm—Staas & Halsey LLP

(57) ABSTRACT

A signal having a low frequency $f_m$ is superposed on a signal having a high frequency $f_1$. The light having the frequency $f_s$ is modulated and transmitted to a transmission line as a wavelength dispersion measurement light. A local oscillation light is multiplexed with the wavelength dispersion measurement light, and heterodyne-detected on a receiving side. Sideband components generated by modulating the frequency $f_s$ within the heterodyne-detected wavelength dispersion measurement light are extracted by bandpass filters, and the wavelength dispersion value of the transmission line is calculated by detecting the phase difference between the sideband components.

21 Claims, 16 Drawing Sheets

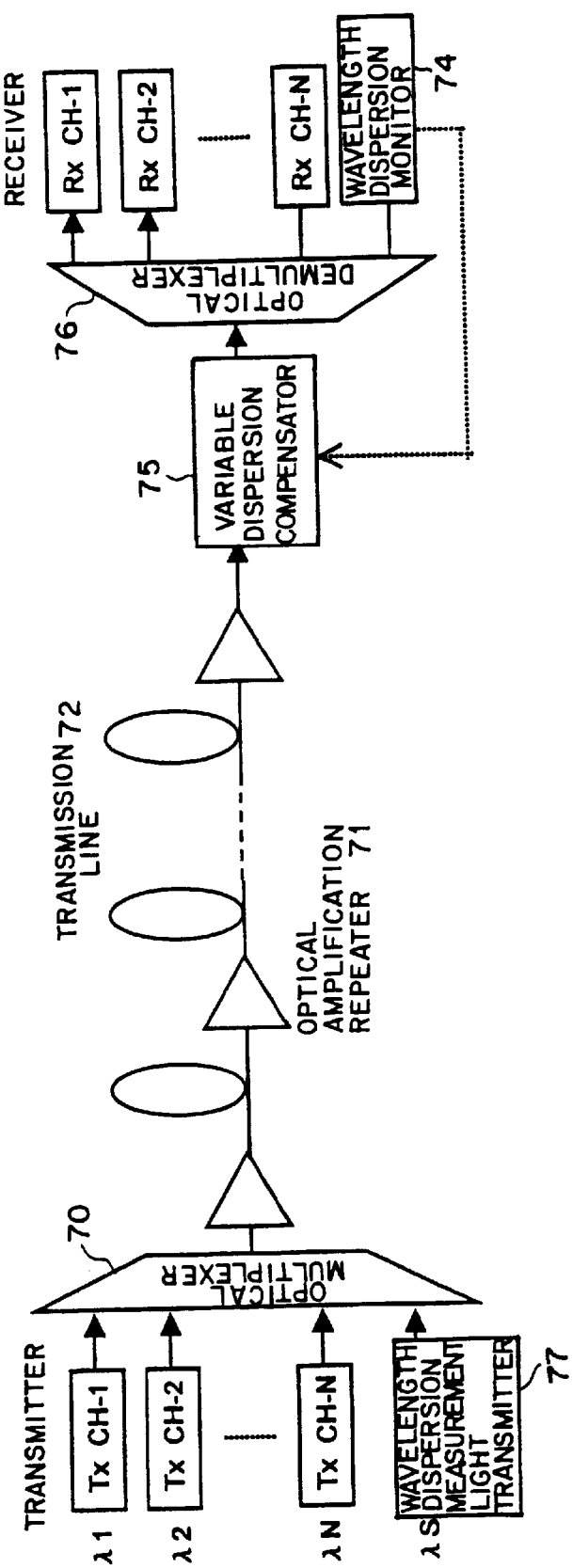
F I G. 14

CASE WHERE WAVELENGTH DISPERSION SIGNAL LIGHT IS ALLOCATED ON LOW FREQUENCY SIDE OF WDM SIGNAL

CASE WHERE WAVELENGTH DISPERSION SIGNAL LIGHT IS ALLOCATED ON HIGH FREQUENCY SIDE OF WDM SIGNAL

WAVELENGTH DISPERSION MEASURING DEVICE AND A METHOD THEREOF

BACKGROUND OF THE INVENTION

1. Field of the Invention

The present invention relates to a device measuring dispersion on an optical transmission line, and more particularly, to a device monitoring a dispersion value of an optical transmission line and optimally compensating for dispersion.

2. Description of the Related Art

Currently, a 10-Gbps optical transmission system starts to be put into use. With a sharp increase in network use in recent years, the demand for further increasing a network capacity has been growing. Since dispersion compensation must be made with high accuracy at a transmission speed of 10 Gbps or faster, it is essential to accurately measure the dispersion value of a transmission line.

In an optical transmission system of a transmission speed of 10 Gbps or faster, its wavelength dispersion tolerance is very small. For example, the wavelength dispersion tolerance of a 40-Gbps NRZ system is 100 ps/nm or smaller. In contrast, for a ground optical transmission system, a relay section is not always uniform. A system using a 1.3 μm zero-dispersion SMF (Single Mode Fiber) of approximately 17 ps/nm/km exceeds the wavelength dispersion tolerance, even if a relay section varies only by several kilometers.

However, in an optical fiber network possessed by a carrier, most of the distances and the wavelength dispersion values of relay sections are not accurately grasped. Furthermore, since a wavelength dispersion value changes with time due to the temperature of an optical fiber or the stress applied to an optical fiber, etc., the dispersion compensation amount for each relay section must be suitably set while strictly measuring the wavelength dispersion amount not only at the start of system use but also in system use. For example, if a temperature change of 100 degrees centigrade occurs on a DSF (Dispersion Shifter Fiber) transmission line of 500 kilometers, a wavelength dispersion change amount results in approximately 105 ps/nm, which is nearly equivalent to the wavelength dispersion tolerance of an NRZ signal.

> (wavelength dispersion change amount)=(temperature dependency of a zero-dispersion wavelength)×(temperature change amount in a transmission line)×(dispersion slope of a transmission line)×(transmission distance)=0.03 (nm/° C.)×100 (° C.)×0.07 (ps/nm$^2$/km)×500 (km)=105 ps/nm where the dispersion slope of a transmission line is a differentiated value (ps/nm$^2$/km) of a dispersion amount, which will be described later.

Accordingly, a system automatically measuring a dispersion amount is essential not only for an SMF transmission line but also for a system using a 1.55 μm zero-dispersion DSF or an NZ-DSF transmission line.

As a currently used wavelength dispersion monitoring method, the following two methods can be cited.

1. twin-pulse method
2. optical phase comparison method

FIG. 1 shows the outline of the configuration of a wavelength dispersion measuring device using the twin-pulse method.

The twin-pulse method is a method obtaining a wavelength dispersion amount (group delay) by using two optical pulse signals having different wavelengths, and by measuring the delay difference between the two pulses after being transmitted over a fiber to be measured. In this case, two LDs producing different wavelengths, and their driving units are required.

First of all, an electric signal pulse is generated from a pulse generator 10, and at the same time, a trigger signal for starting measurement is transmitted to a group delay measuring instrument. The electric pulse transmitted from the pulse generator 10 is input to two driving units 11-1 and 11-2, which are made to simultaneously output optical pulses to LDs 12-1 and 12-2 that respectively produce lights having wavelengths λ1 and λ2. Optical pulses produced by the LDs 12-1 and 12-2 are multiplexed by an optical multiplexer such as a half mirror 13, a coupler, etc., and are propagated through an optical fiber transmission line 14. The two optical pulses that propagate through the optical fiber transmission line 14 are detected by a detector 15, and the detection result of the optical pulses is transmitted to the group delay measuring instrument 17. In the meantime, the trigger signal output from the pulse generator 10 is delayed in a delaying circuit 16 by an amount of time required to propagate the optical pulses through the optical fiber transmission line, and input to the group delay measuring unit 17 as a trigger signal for starting up the group delay measuring unit 17.

The group delay measuring unit 17 detects the difference between the arrival times of the two optical pulses detected by the detector 15, and calculates the group delay times of the optical pulses having the wavelengths λ1 and λ2.

FIGS. 3A and 3B show the states of optical pulses propagated with the twin-pulse method.

As shown in FIG. 3A, optical pulses having wavelengths λ1 and λ2 are simultaneously generated, multiplexed, and output. Since the optical pulses having the wavelengths λ1 and λ2 are simultaneously output at this time, the pulses are multiplexed into one and input to a transmission line as shown on the right side of FIG. 3A. However, a group delay is caused by the wavelength dispersion of the transmission line. Therefore, when the optical pulses having the wavelengths λ1 and λ2 are received on a receiving side, there is a reception time lag between the optical pulses as shown in FIG. 3B. Here, it is assumed that the group delay of the optical pulse having the wavelength λ1 is larger than that of the optical pulse having the wavelength λ2.

Accordingly, a group delay time can be calculated based on the difference between the arrival times of the two optical pulses having the wavelengths λ1 and λ2, and a wavelength dispersion amount can be calculated by using the difference between the wavelengths λ1 and λ2.

FIG. 2 shows the outline of the configuration of a wavelength dispersion measuring device using the optical phase comparison method.

The optical phase comparison method is a method obtaining a wavelength dispersion amount not by directly measuring a group delay time difference, but by acquiring a phase difference between modulated optical signals, which is caused by a group delay time difference.

First of all, an electric pulse is generated by a pulse generator 10. At the same time, a trigger signal for notifying a phase detector 18 of a measurement reference time of the propagation time of an optical pulse is transmitted by the pulse generator 10.

The electric pulse transmitted from the pulse generator 10 is input to a driving unit 11, and an optical pulse having a wavelength λ is output from an LD 12. This optical pulse propagates through a transmission line 14, and is detected by a photodetector 15. The photodetector 15 inputs the signal indicating the detection of the optical pulse to a phase detector 18. The phase detector 18 measures the delay time of the arrival of the optical pulse with reference to the time at which the trigger signal is received from the pulse generator 101.

Then, the wavelength of the optical pulse transmitted from the LD 12 is changed, and the above described measurement is repeated in a similar manner. As a result, the propagation time of the optical pulse, which indicates the delay time when the optical pulse transmitted with the different wavelength is detected on a receiving side from the reference time, may differ. This propagation time difference is a group delay time difference. When the group delay time difference is obtained in this way, the wavelength dispersion of a transmission line is obtained from the wavelength difference and the group delay time difference.

FIG. 3C shows the state of optical pulses used in the optical phase comparison method.

If the input time of the trigger signal input from the pulse generator 10 to the phase detector 18 is used as a reference, there is almost no difference between the travel distances of the optical pulses having the wavelengths $\lambda 1$ and $\lambda 2$ at the reference time. Namely, the reference time is a time point immediately after the optical pulse is output from the LD 12, an instant when the optical pulse it output, etc. Accordingly, no influence of wavelength dispersion on the transmission line has been exerted yet. However, when the optical pulse having the wavelength $\lambda 1$ is detected by the photodetector 15, the optical pulse is in the state of being influenced by the wavelength dispersion on the transmission line after being propagated. Also the optical pulse having the wavelength $\lambda 2$ is in the same state when being detected by the optical detector 15.

Here, if the wavelength dispersion of the wavelength $\lambda 1$ is assumed to be larger than that of the wavelength $\lambda 2$, the speed at which the optical pulse having the wavelength $\lambda 1$ propagates through the transmission line is slower than that of the optical pulse having the wavelength $\lambda 2$. As a result, the amount of time required until the optical pulse having the wavelength $\lambda 1$ is detected after propagating through the transmission line 14 becomes longer. Accordingly, a group delay time caused by the wavelength dispersion of a transmission line can be measured by detecting the difference between the times when the optical pulses having the wavelengths $\lambda 1$ and $\lambda 2$ arrive at the photodetector 15. Then, the wavelength dispersion can be measured from the group delay time and the wavelength difference.

However, since the propagation time of a transmission line is included and the group delay time difference between two waves is obtained from a phase difference with these methods, the propagation delay time of a transmission line must be accurately obtained. Additionally, the number of components such as LDs, driving units, etc. are large. Furthermore, a high SNR is required to make a phase comparison on the order of GHz at a receiving end, leading to a difficulty in securing the optical SNR at the receiving end of a wavelength dispersion light to be monitored.

SUMMARY OF THE INVENTION

An object of the present invention is to provide a wavelength dispersion measuring device which has a small number of components, and causes no optical SNR problem.

A wavelength dispersion measuring device according to the present invention comprises: a modulating unit modulating a light output from a light source; a transmitting unit transmitting the modulated light to a transmission line as a wavelength dispersion measurement light; a light receiving unit receiving the modulated light which propagates through the transmission line; a filter unit extracting a sideband signal from the received modulated light; and a phase difference detecting unit detecting a phase difference between different frequency band components of the sideband signal, and is characterized in that the wavelength dispersion value of the transmission line is calculated from the phase difference.

A wavelength dispersion measuring method according to the present invention comprises the steps of: (a) modulating a light output from a light source; (b) transmitting the modulated light to a transmission line as a wavelength dispersion measurement light; (c) receiving the modulated light which propagates through the transmission line; (d) extracting a sideband signal from the received modulated light; and (e) detecting a phase difference between different frequency band components of the sideband signal, and is characterized in that the wavelength dispersion value of the transmission line is calculated from the phase difference.

According to the present invention, a wavelength dispersion value is measured with the wavelength difference between side lobes of a wavelength dispersion measurement light. Accordingly, there is no need to measure the propagation delay time of a transmission line, leading to simplification of the circuitry configuration of the device, and a reduction in the number of components. Additionally, if a sideband signal is extracted by using heterodyne detection, the frequency band can be dropped from an optical to an electric frequency, and the phase difference between sideband signals can be accurately detected by measuring the electric signal, etc. Consequently, a noise amount included at the time of the detection of the phase difference can be reduced, thereby improving the optical SNR.

BRIEF DESCRIPTION OF THE DRAWINGS

FIG. 14 exemplifies the configuration of an automatic dispersion compensating system in the case where a wavelength dispersion measurement light is passed through the variable dispersion compensator within the system;

DESCRIPTION OF THE PREFERRED EMBODIMENTS

First of all, the normal relationship between a phase difference and a dispersion amount is explained.

Assume that the propagation time of a transmission line per unit length is t. Because this t changes according to a wavelength, it is set as $t(\lambda)$. The dispersion amount is defined as a change in a propagation delay time, which corresponds to a wavelength change as follows.

dispersion amount=$dt(\lambda)/d\lambda$

A change amount of the dispersion amount is referred to as a dispersion slope, and is defined as follows.

dispersion slope=$d(dt(\lambda)/d\lambda)/d\lambda$

If the dispersion amount is discretized, $dt/d\lambda = \Delta t/\Delta\lambda$

Here, the change amount $\Delta t$ is proportional to a phase difference $\Delta\theta$ as is known.

$\Delta t \lambda 1/f \times \Delta\theta$

Accordingly, the dispersion amount can be obtained by measuring the phase difference $\Delta\theta$ corresponding to a frequency difference.

According to one preferred embodiment of the present invention, the intensity of light is modulated with a high-frequency signal ($f_1$) by using a pair of light sources and an intensity modulator, and the wavelength dispersion amount of a transmission line is measured by obtaining a group delay time difference between the sideband signals resultant from the modulation. According to another preferred embodiment of the present invention, the intensity of light is modulated with two high-frequency signals having different frequencies ($f_1$, $f_2$), and the wavelength dispersion amount of a transmission line is measured from the group delay time difference between the sideband signals having different wavelengths resultant from the modulation.

Figure 1:
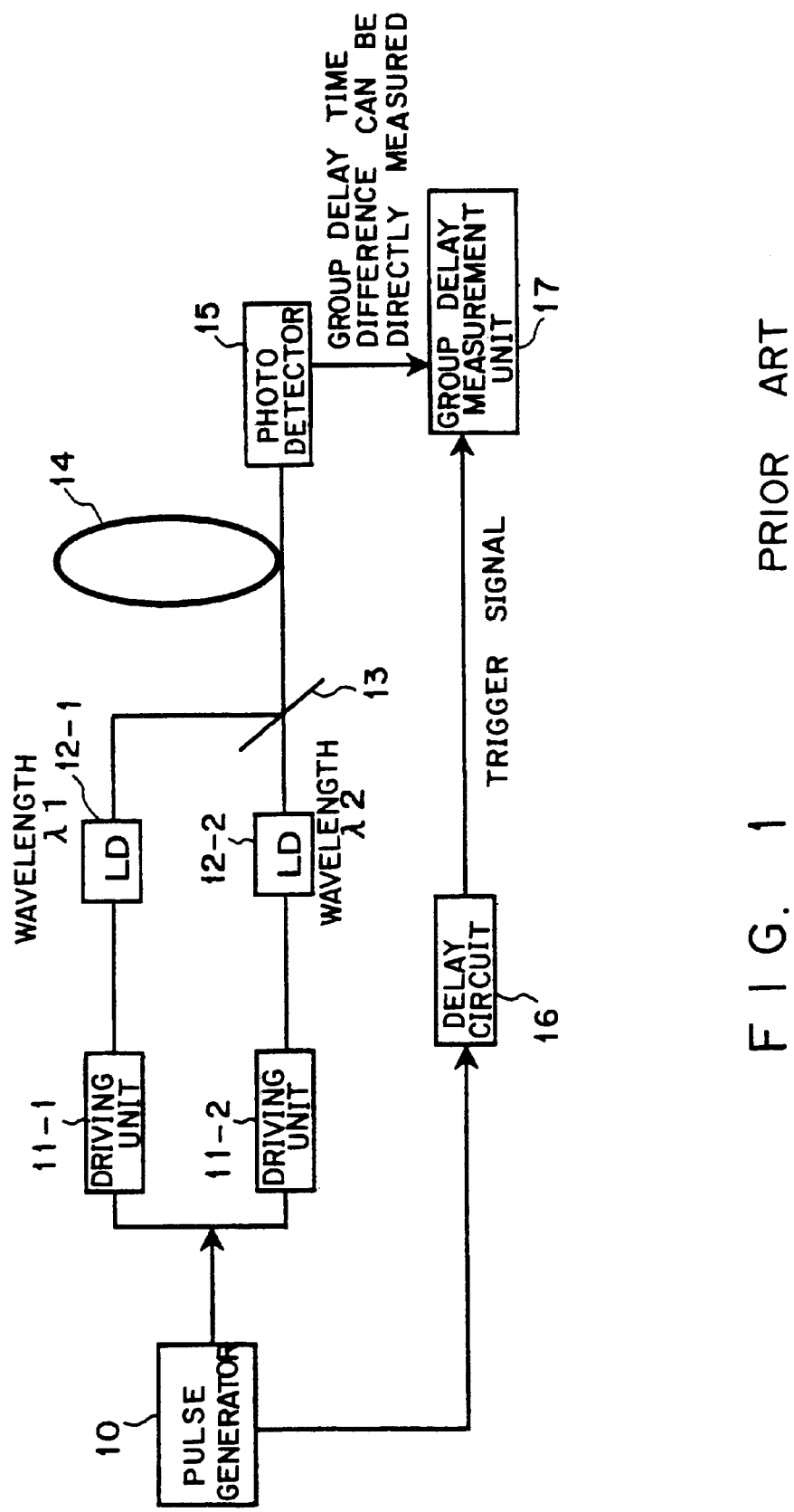
FIG. 1 shows the outline of the configuration of a wavelength dispersion measuring device using a twin-pulse method.
Figure 2:
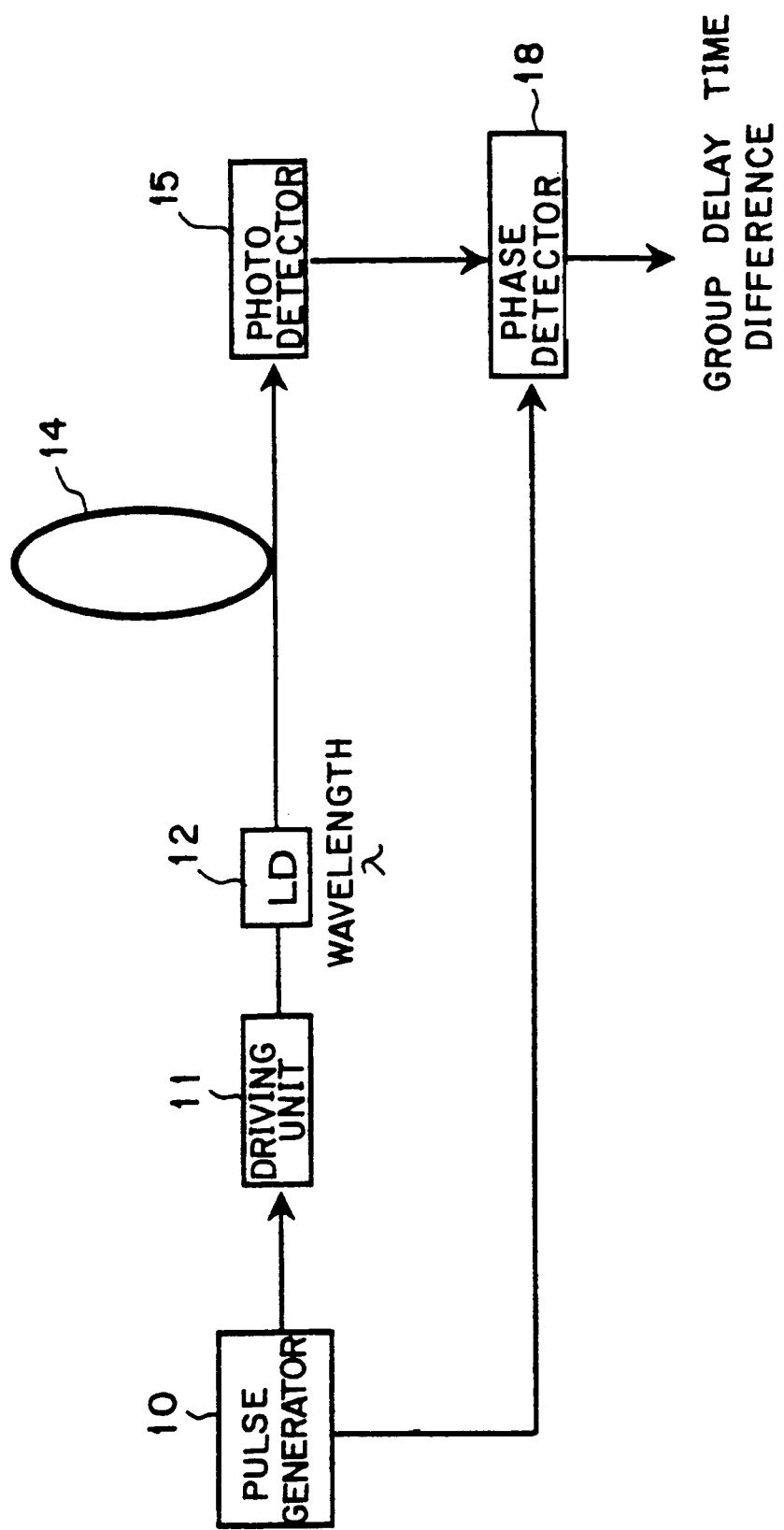
FIG. 2 shows the outline of the configuration of a wavelength dispersion measuring device using an optical phase comparison method.
Figure 3A:
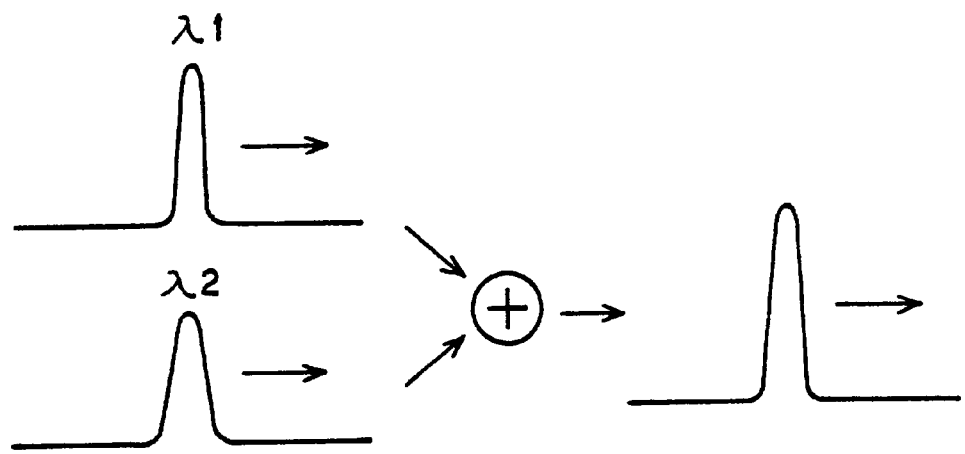
FIGS. 3A and 3B show the propagation states of optical pulses in the twin-pulse method.
Figure 3B:
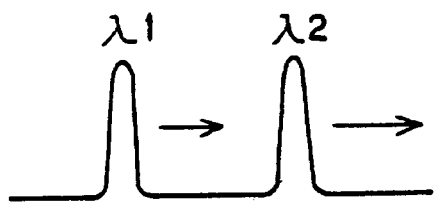
Figure 3C:
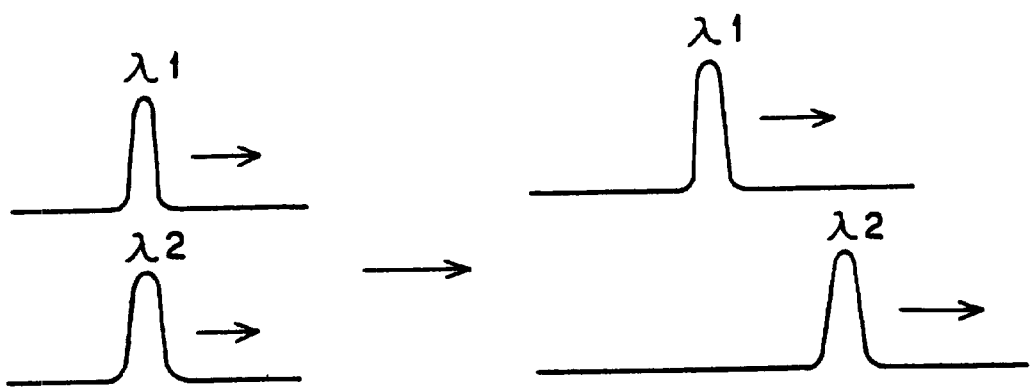
FIG. 3C shows the states of optical pulses in the optical phase comparison method.
Figure 4:
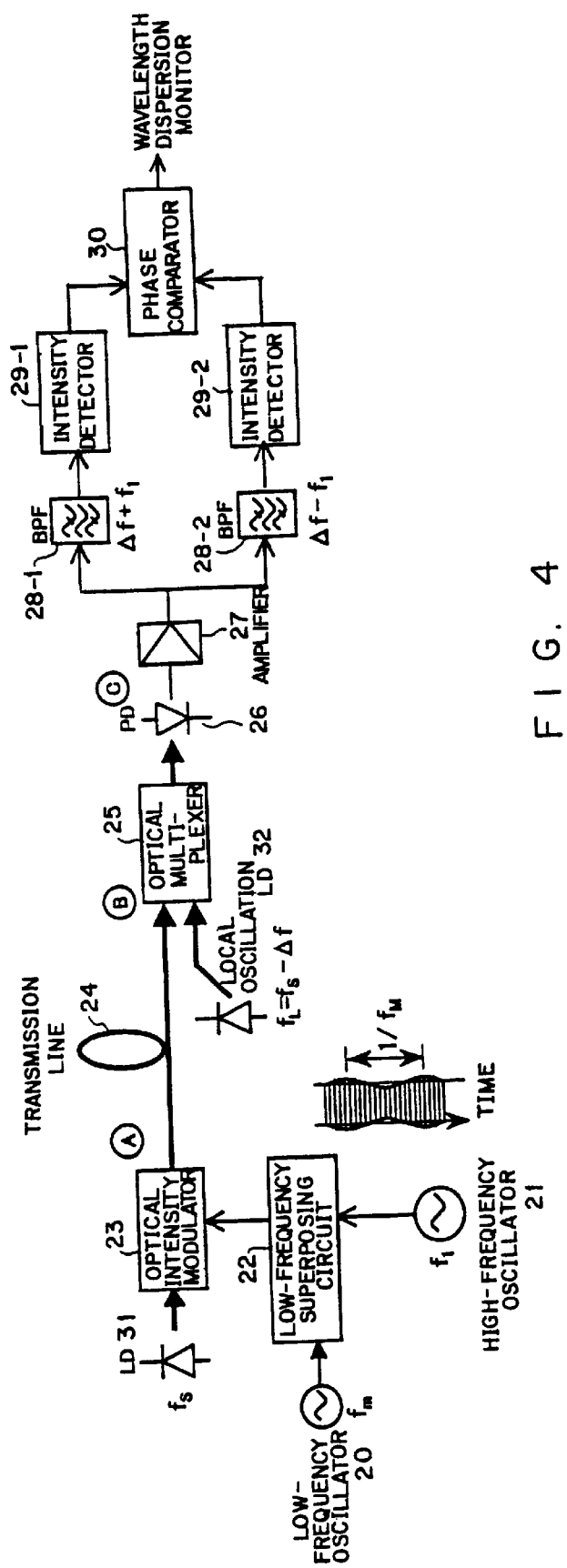
FIG. 4 explains a wavelength dispersion measuring device according to a first preferred embodiment of the present invention.

FIG. 4 explains a wavelength dispersion measuring device according to a first preferred embodiment of the present invention.

First of all, on a transmitting side, a high-frequency signal having a signal frequency ($f_1$) on which a low-frequency signal $f_m$ is superposed is used as a driving signal of an intensity modulator. To implement this, a low-frequency oscillator 20 generating an electric signal having a frequency $f_m$, and a high-frequency oscillator 21 generating an electric signal having a frequency $f_1$ are arranged, and a low-frequency signal is superposed on a high-frequency signal in a low-frequency superposing circuit 22. Then, the high-frequency signal on which the low-frequency signal is superposed is applied to an optical intensity modulator 23, which modulates the intensity of the light from an LD 31 which outputs a light having a frequency $f_s$.

Figure 5A:
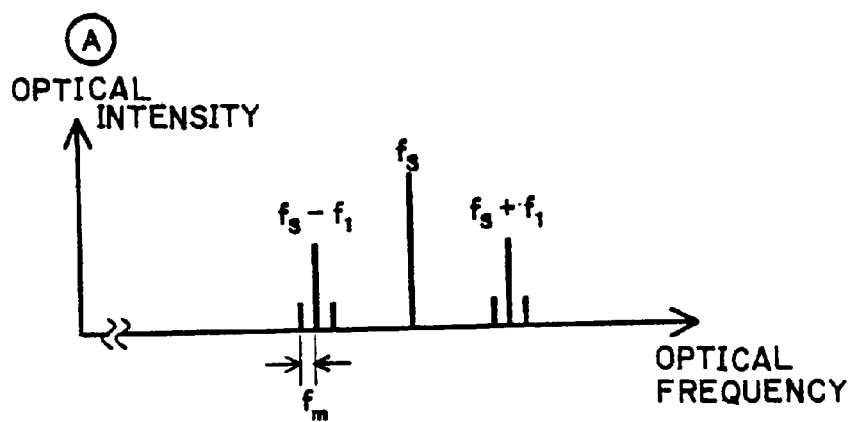
FIGS. 5A through 5C show the states of optical spectra of respective units shown in FIG. 4.

Spectrum of the light output from the optical intensity modulator 23 is shown in FIG. 5A.

Optical sidebands $f_s - f_1$ and $f_s + f_1$ are produced symmetrically with respect to an optical oscillation frequency $f_s$ from the LD 31, and sub-sidebands -fm and +fm are respectively produced by superposing a low-frequency signal.

When this wavelength dispersion measurement light propagates through a transmission line, a propagation delay difference occurs between the sidebands due to the wavelength dispersion of the transmission line. This delay difference is detected at a receiving end.

Figure 5B:
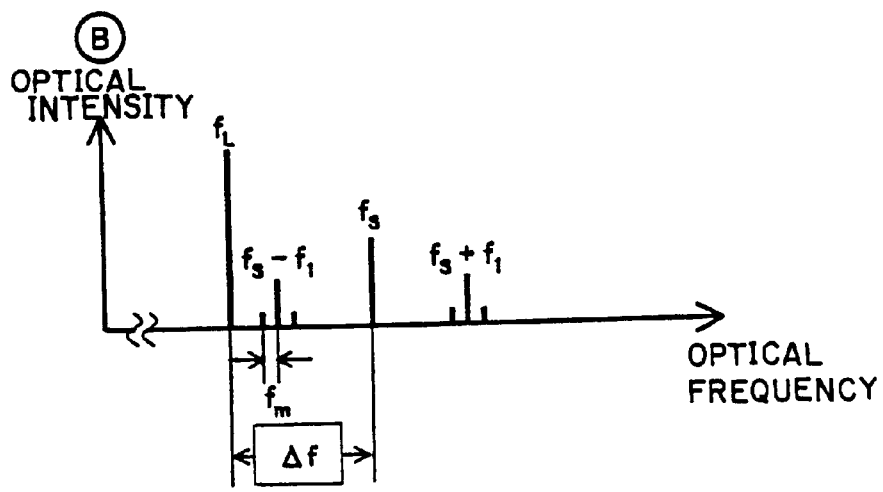
Figure 5C:
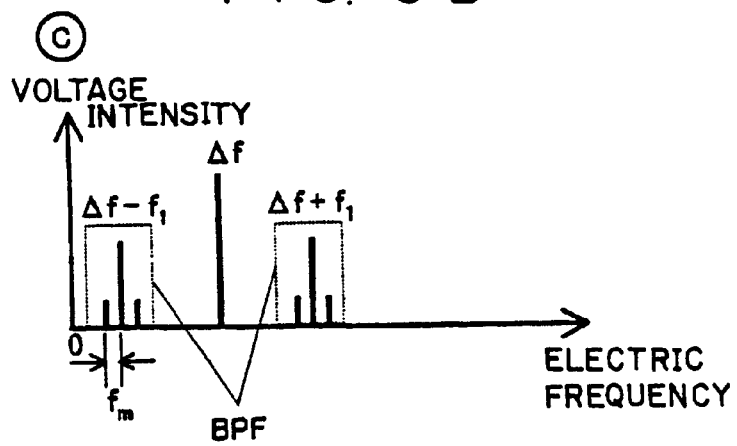

At this time, a location oscillation light source of an oscillation frequency $f_L$ (=$f_s - \Delta f$) is prepared on a receiving side, and this oscillation frequency and the wavelength dispersion measurement light propagating through the transmission line are heterodyne-detected. That is, after the wavelength dispersion measurement light propagates through a transmission line 24, it is multiplexed with the local oscillation light from a local oscillation LD 32, and the multiplexed light is detected by a PD (Photo Diode) 26 for reception. The optical spectrum range before the wavelength dispersion measurement light and the local oscillation light are multiplexed is shown in FIG. 5B. Additionally, the frequency spectrum at an electric stage after being hetrodyne-detected by the PD 26 is shown in FIG. 5C.

After the signal obtained by being heterodyne-detected is amplified by an amplifier 27, it is split into two. Then, two sideband components are extracted by using bandpass filters (BPFs) 28-2 and 28-1 having central wavelengths $\Delta f - f_1$ and $\Delta f + f_1$. Next, their intensities are detected by intensity detectors 29-1 and 29-2, so that a signal the intensity of which varies with the frequency $f_m$ superposed on the transmitting side is obtained. The phase difference between the modulated signals the intensities of which are changed corresponds to the propagation delay difference between the optical sidebands $f_s - f_1$ and $f_s + f_1$.

If the principle of the wavelength dispersion measurement according to this preferred embodiment is put into an equation by being limited to the optical sidebands $f_s - f_1$ and $f_s + f_1$, it is represented as follows.

driving signal of an optical intensity modulator:

$F_m(t)\cos(2\pi f_1 t)$ signal on which a low-frequency signal is superposed:
$F_m(t) = A\cos(2\pi f_m t + \beta)$ [where A and $\beta$ are arbitrary constants]

optical signal after being transmitted:

$F_m(t)\cos(2\pi f_1 t) + F_m(t-\tau)\cos(2\pi f_1(t-\tau))$ where $\tau$ is a propagation delay time difference between two side lobes.

electric signal after being heterodyne-detected $F_m(t)\cos(2\pi(\Delta f - f_1)t) + F_m(t-\tau)\cos(2\pi(\Delta f + f_1)t - 2\pi f_1 \tau))$ Principal part of the derivation process of the above described equations is more specifically explained below.

If an equation $F_m(t)=A\cos(2\pi f_m t+\beta)$ is substituted into an equation $F_m(t)\cos(2\pi f_1 t)$, $$G(t)=A\cos(2\pi f_m t+\beta)\cos(2\pi f_1 t)$$

This equation is represented as a wave of a complex representation $F_m(t)\exp(j2\pi f_1)$. Namely, $G(t)$ is a real part of $F_m(t)\exp(j2\pi f_1 t)$.

For the optical signal after being transmitted, the output of the modulator that modulates $f_1$ with $f_m$ results in a spectrum having the sidebands $f_s-f_1$ and $f_s+f_1$ centering on $f_s$. Assuming that the optical signal is $E_s=\exp(j2\pi f_s t)$ in a complex representation, the operations of the optical intensity modulator, the operations of which are multiplication, are represented by the sum of $F_m(t)\cdot\exp(j2\pi f_1 t)$, $F_m(t)\cdot\exp(-j2\pi f_1 t)\cdot E_s$ and $E_s$. If only the real part of the sideband of the optical signal after being transmitted is considered, $$F_m(t)\cos(2\pi f_1 t)+F_m(t-\tau)\cos(2\pi f_1(t-\tau))$$

where $\tau$ is a propagation delay time difference between the two side lobes.

When the signal is input to the optical heterodyne multiplexer, $\exp(j2\pi f_L t)$ is further added.

$$E=F_m(t)\exp(j2\pi(f_s-f_1)t)+F_m(t)\exp(j2\pi f_s t)+F_m(t)\exp(j2\pi(f_s+f_1)t)+\exp(j2\pi f_L t)$$

Additionally, since the heterodyne detection is E·E* (E* is a complex conjugate), the signal becomes as follows.

$$E \cdot E^* = \{F_m(t)\exp(j2\pi(f_s-f_1)t)+\exp(j2\pi f_s t)+F_m(t)\exp(j2\pi(f_s+f_1)t)+\exp(j2\pi f_L t)\} \times \{F_m$$

$$(t)\exp(-j2\pi(f_s-f_1)t)+\exp(-j2\pi f_s t)+F_m(t)\exp(-j2\pi(f_s+f_1)t)+\exp(-j2\pi f_L t)\}$$

Here, a principal item is only the following one. Namely, a product of $\{F_m(t)\exp(j2\pi(f_s-f_1)t)+\exp(j2\pi f_s t)+F_m(t)\exp(j2\pi(f_s+f_1)t)+\exp(j2\pi f_L t)$ and $\exp(-j2\pi f_L t)\}$ Furthermore, if the delay of each of the sidebands $\tau$ is considered, one of the sidebands is represented by $$F_m(t)\cdot\exp(j2\pi(f_s-f_1)t)\times\exp(-j2\pi f_L t)=F_m(t)\cdot\exp(j2\pi(f_s-f_L-f_1)t)$$

The other of the sidebands is represented by $$F_m(t-\tau)\cdot\exp(j2\pi(f_s+f_1)(t-\tau))\times\exp(-j2\pi f_L t)=F_m(t-\tau)\cdot\exp(j2\pi(f_s+f_1-f_L)(t-\tau))\cdot\exp(-j2\pi f_L\tau)$$

If the only real part is represented, the equation becomes as follows.

$$F_m(t)\cos(2\pi(\Delta f-f_1)t)+F_m(t-\tau)\cos(2(\Delta f+f_1)(t-\tau))$$

Here, $\tau=\Delta t$. If this is measured, it can be measured in a range having a low frequency $\Delta f$ as shown in FIG. 5C. Here, $\Delta f=f_s-f_L$.

Figure 6:
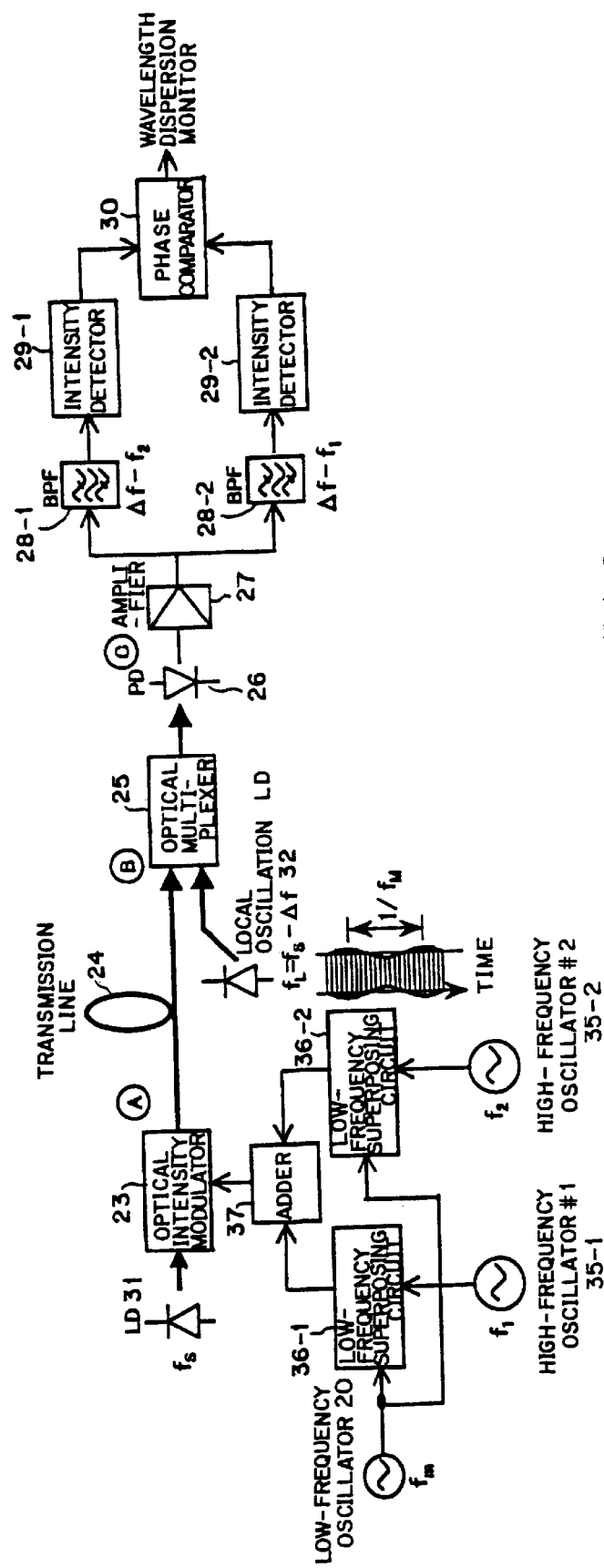
FIG. 6 shows a wavelength dispersion measuring device according to another preferred embodiment of the present invention.

FIG. 6 shows the configuration of a wavelength dispersion measuring device according to another preferred embodiment of the present invention.

On a transmitting side, a signal obtained by adding two types of high-frequency signals, which respectively have single frequencies and $f_1$ and $f_2$ and a low-frequency signal $f_m$ is respectively superposed on, is used as a driving signal of an intensity modulator. Namely, a low-frequency oscillator 20 and high-frequency oscillators #1 and #2 35-1 and 35-2 are arranged. A low-frequency signal is respectively superposed on the high-frequency signals generated from the high-frequency oscillators #1 and #2 35-1 and 35-2 by low-frequency superposing circuits 36-1 and 36-2. Then, the two signals are added by an adder 37, and applied to an optical intensity modulator 23. As the light for the optical intensity modulator, the light having a frequency $f_s$ from the LD 31 is used.

Figure 7A:
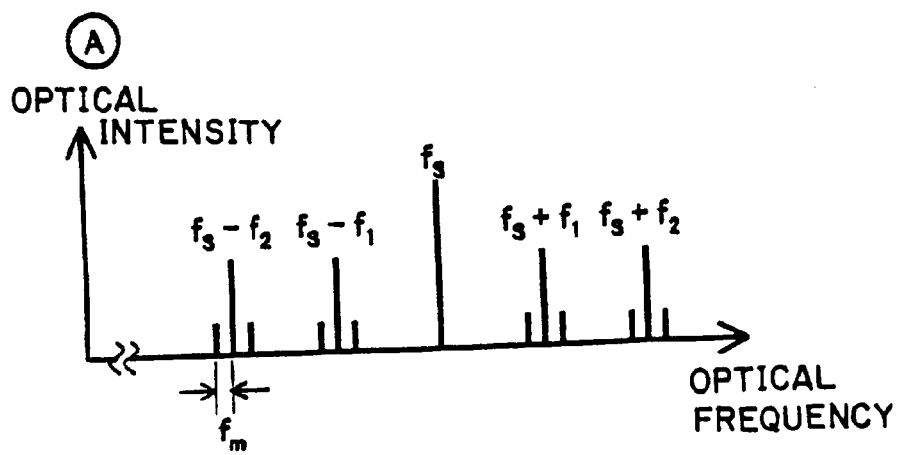
FIGS. 7A through 7C show the states of optical spectra of the respective units shown in FIG. 6.

Optical spectrum generated with the above described configuration is shown in FIG. 7A.

Optical sidebands $f_s-f_2$, $f_s-f_1$, $f_s+f_1$, and $f_s+f_2$ are produced symmetrically with respect to the oscillation frequency $f_s$ of the wavelength dispersion measurement light, and besides, sub-sidebands $-f_m$ and $+f_m$ are produced by respectively superposing a low-frequency signal.

When this wavelength dispersion measurement light (the optical signal modulated by the optical intensity modulator 23) propagates through the transmission line, a propagation delay difference occurs between the sidebands. In this preferred embodiment, $f_s-f_2$ and $f_s-f_1$ are selected from among the four sidebands on a receiving side, and the propagation delay difference between them is detected. This difference is detected in a way such that a local oscillation light source of an oscillation frequency $f_L(=f_s-\Delta f)$ is prepared on a receiving side, and the heterodyne detection between the signal having the frequency $f_L$ and the wavelength dispersion measurement light which propagates through the transmission line is made.

Figure 7B:
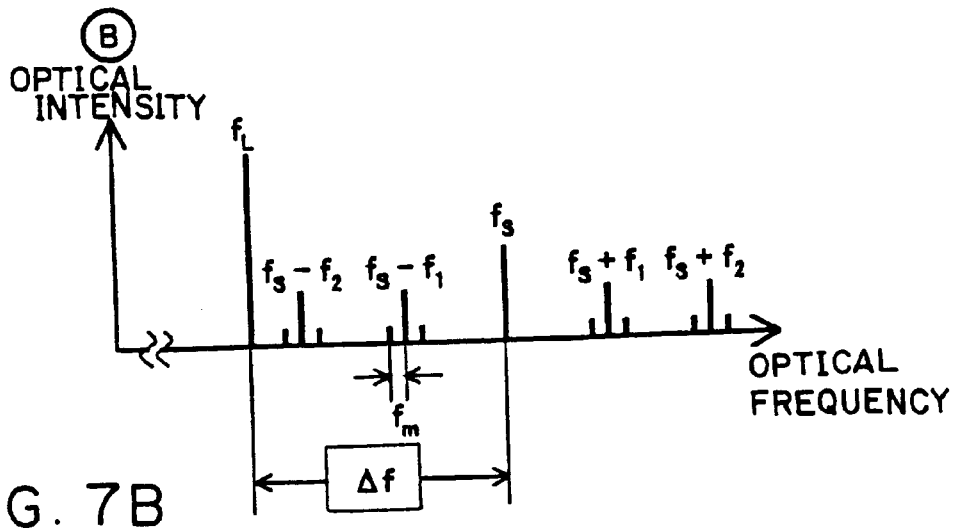
Figure 7C:
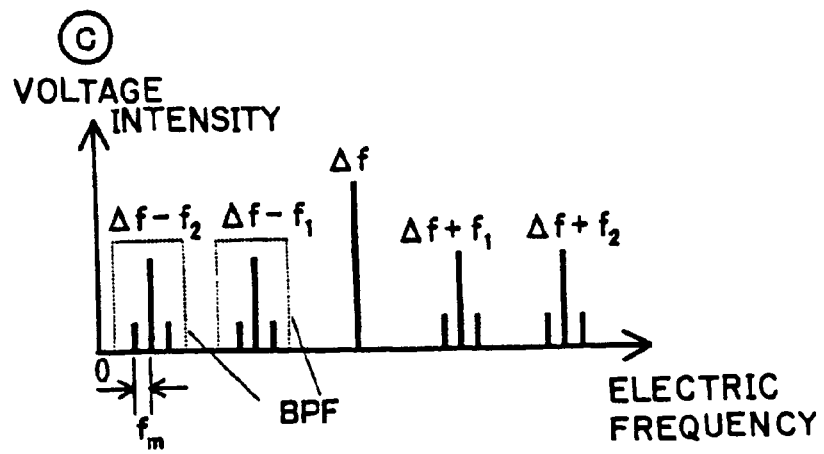

Namely, after the wavelength dispersion measurement light propagates through the transmission line 24, it is multiplexed by an optical multiplexer 25 with the light generated from the local oscillator LD 32. The spectrum allocation at this time is shown in FIG. 7B. Then, the wavelength dispersion measurement light multiplexed with the local oscillation light is received by the PD 26, and converted into an electric signal. The spectrum at an electric stage after the heterodyne detection is shown in FIG. 7C.

After this signal is amplified by an amplifier 27, it is branched into two. Two sideband components are then extracted from the branched signals by respectively using bandpass filters (BPFs) 28-1 and 28-2 having the bandwidths $\Delta f-f_2$ and $\Delta f-f_1$. Next, the intensities of the sideband components are detected by using intensity detectors 29-1 and 29-2, so that the signal the intensity of which changes with a frequency $f_m$ superposed on a transmitting side can be obtained. Then, the phase difference between the signals detected by the intensity detectors 29-1 and 29-2 is measured by a phase comparator 30. This phase difference between the two signals the intensities of which are modulated corresponds to the propagation delay difference between the optical sidebands $f_s-f_2$ and $f_s-f_1$.

The principle of the wavelength dispersion measurement according to this preferred embodiment is represented as follows, if it is put into an expression by being limited to the optical sidebands $f_s-f_2$ and $f_s-f_1$.

driving signal: $F_m(t)\cos(2\pi f_1 t)+F_m(t)\cos(2\pi f_2 t+\alpha)$ signal on which a low-frequency signal is superposed: $F_m(t)=A\cos(2\pi f_m t+\beta)$ optical signal after being transmitted:

$$F_m(t)\cos(2\pi f_1 t)+F_m(t-\tau)\cos(2\pi f_2(t-\tau)+\alpha)$$

where $\tau$ is a propagation delay time difference between a light having a frequency $f_1$ and a light having a frequency $f_2$, which is caused by the wavelength dispersion of a transmission line.

electric signal after being heterodyne-detected $F_m(t)\cos(2\pi(\Delta f-f_1)t)+F_m(t-\tau)\cos(2\pi(\Delta f-f_2)t-2\pi f_2\tau+\alpha))$ The phase of the low-frequency signal superposed on the two high-frequency signals must be settled on the transmitting side in FIG. 6. If there is a phase difference on the transmitting side, it must be canceled by a phase comparator on the receiving side.

Additionally, the amplitudes of the signals input to a phase comparator on the receiving side in FIGS. 4 and 6 must be equalized, and amplitude saturation (limit) must be determined prior to the phase comparator.

According to the preferred embodiment of the present invention, the wavelength dispersion amount of an existing transmission line can be measured with high accuracy, whereby the dispersion in an ulta-fast optical transmission system can be compensated with high accuracy.

In the above described preferred embodiment, the signal for measuring wavelength dispersion is extracted by using bandpass filters, whereby the frequency range input to an intensity measuring device is narrowed, and an optical SNR can be improved.

EXAMPLE OF FREQUENCY SETTING

Assuming that $f_1=10$ GHz and $\Delta f=f_s-f_L=15$ GHz are set in the configuration shown in FIG. 4, the frequencies of the two BPFs on the receiving side are respectively set to 5 GHz and 25 GHz.

Assuming that $f_1=20$ GHz, $f_2=40$ GHz, and $\Delta f=f_s-f_L=50$ GHz are set in the configuration of FIG. 6, the frequencies of the two BPFs on the receiving side are respectively set to 10 GHz and 30 GHz.

Assuming that the wavelength dispersion value of a transmission line to be measured is 1000 ps/nm, the frequency difference between the two wavelength dispersion measurement lights is 20 GHZ in both of the examples of the frequency settings in FIGS. 4 and 6. Therefore, a maximum propagation delay time difference results in 20/125× 1000=160 ps (1 nm=125 GHz in a 1.55 μm band).

If 160 ps is assumed to be 1 percent of one cycle of a low-frequency component, $f_m=1/(160\times10^{-2}\times100)=62.5$ MHz may be set.

If 10 ps/nm is requested as the measurement accuracy of a wavelength dispersion value, phase difference detection as accurate as 0.01 percent (1.6 ps) of one cycle of a low-frequency component (62.5 MHz is demanded) is required.

As described above, a setting value of $f_m$ is determined depending on a demanded wavelength dispersion measurement accuracy, the total wavelength dispersion value of a transmission line to be measured, and a low-frequency phase difference detection accuracy to be demanded, as described above.

FIGS. 8 through 12 exemplify the configuration for the heterodyne detection in a wavelength dispersion measuring device according to the preferred embodiment of the present invention.

FIGS. 8 through 12 adopt the configuration shown in FIG. 6 (the configuration of the transmitting side and the BPF frequencies on the receiving side). However, also the configuration shown in FIG. 4 may be applied. Namely, the single high-frequency oscillator on the transmitting side is used, and the optical sideband signals having $\Delta f-f_1$ and $\Delta f+f_1$ are extracted by bandpass filters on a receiving side, so that the phase difference between these signals may be measured.

Additionally, to set the sideband component within the electric BPF bandwidth in the heterodyne detection on the receiving side in all cases, automatic frequency control (AFC) can possibly be performed for a local oscillation light if the frequency of a wavelength dispersion measurement light fluctuates.

Furthermore, to maximize the efficiency of the heterodyne detection on the receiving side, the polarization plane of the wavelength dispersion measurement light to be multiplexed and that of the local oscillation light must coincide. This is because both of these lights cannot be efficiently multiplexed if the polarization planes of the lights do not coincide. Namely, the multiplexed lights are not mixed completely (a frequency conversion capability, etc. do not fully work). Especially, if the polarization planes of both of the lights are orthogonal, they are not mixed at all (these lights propagate as absolutely independent lights). Therefore, it is necessary to make their polarization planes coincide. Examples of this method include an active polarization method and a polarization diversity method.

With the active polarization method, a polarization controller is automatically controlled to maximize an electric reception intensity while monitoring the intensity on a receiving side.

Figure 8:
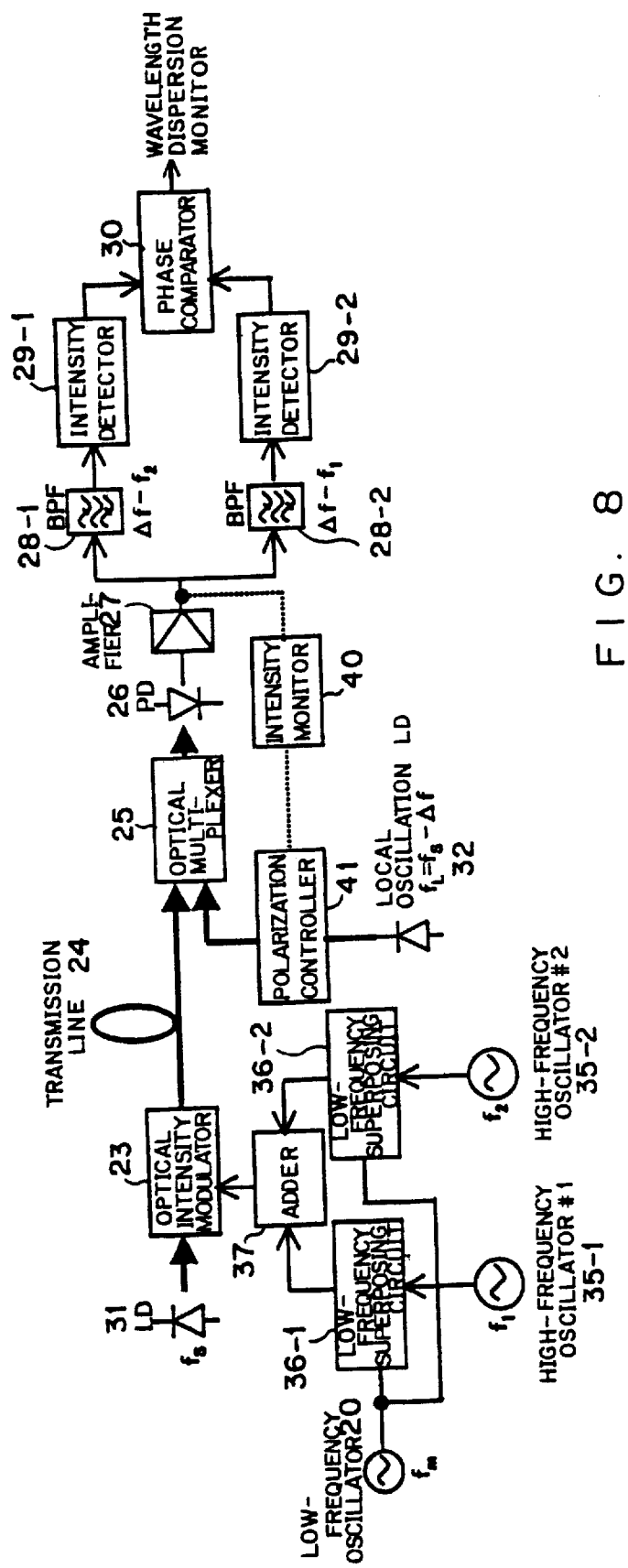
FIG. 8 exemplifies the configuration for heterodyne detection of the wavelength dispersion measuring device according to the preferred embodiment of the present invention (No. 1)

FIG. 8 shows the configuration of the active polarization method which optimizes the polarization state of a local oscillation light.

The same constituent elements as those shown in FIG. 6 are denoted with the same reference numerals.

A signal having a high frequency $f_1$ is output from the high-frequency oscillator #1 35-1, whereas a signal having a high frequency $f_2$ is output from the high-frequency oscillator #2 35-2. A signal having a low frequency $f_m$ generated from the low-frequency oscillator 20 is respectively superposed on the high-frequency signals by the low-frequency superposing circuits 36-1 and 36-2. The high-frequency signals on which the low-frequency signal is superposed are added by an adder 37, and the added signal is applied to an optical intensity modulator 23. The intensity of the light having a frequency $f_s$, which is input from the LD 31 to the optical intensity modulator 23, is modulated with the high-frequency signal applied from the adder 37.

The optical signal the intensity of which is modulated propagates through the transmission line 24, and enters the optical multiplexer 25. Additionally, the local oscillation light from the local oscillation LD 32, which is polarization-controlled by a polarization controller 41, is input to the optical multiplexer 25, and multiplexed with the above described signal. The optical signal output from the optical multiplexer 25 is received by the PD 26, and converted into an electric signal. The amplifier 27 amplifies the output of the PD 26, and transmits the amplified output to the succeeding stage.

The output of the amplifier 27 is input to an intensity monitor 40. The intensity of the optical signal received by the PD 26 is detected, and at the same time, a control signal is transmitted to the polarization controller 41 so that the intensity of the received light is maximized. With such a feedback system, the polarization plane of the local oscillation light is controlled to coincide with the wavelength dispersion measurement light in all cases.

Furthermore, the output of the amplifier 27 is branched into two, from which sideband signals having corresponding frequencies are extracted by the bandpass filters 28-1 and 28-2 the central frequencies of which are respectively $\Delta f-f_2$ and $\Delta f-f_1$. The sideband signals extracted by the bandpass filters 28-1 and 28-2 are respectively detected by the intensity detectors 29-1 and 29-2. Then, the phase difference between the sideband signals is detected by the phase comparator 30. This phase difference is converted into a wavelength dispersion value, and displayed on a wavelength dispersion monitor not shown.

Figure 9:
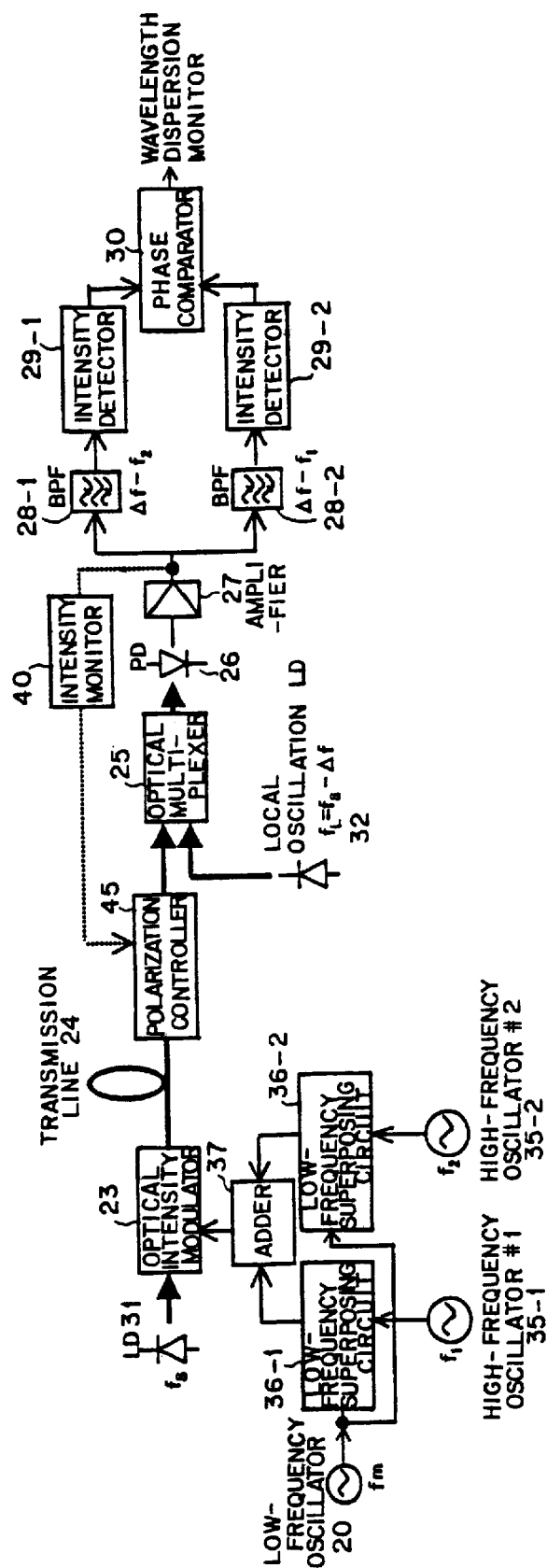
FIG. 9 exemplifies the configuration for heterodyne detection of the wavelength dispersion measuring device according to the preferred embodiment of the present invention (No. 2)

FIG. 9 shows another configuration of the active polarization method optimizing the polarization state of a wavelength dispersion measurement light which propagates through a transmission line.

In this figure, the same constituent elements as those shown in FIG. 8 are denoted with the same reference numerals.

In the configuration shown in FIG. 9, a high-speed polarization controller and a feedback control system, which follow the changing speed of the polarization state of the wavelength dispersion light while being propagated on a transmission line.

In this configuration, a polarization controller 45 is arranged not on the side of the local oscillation LD 32 but on the transmission line through which the wavelength dispersion measurement light propagates. Namely, the polarization of the wavelength dispersion measurement light which propagates through the transmission line is controlled to maximize the optical reception intensity of the PD 26, which is detected by the intensity monitor 40. Since the polarization of the local oscillation light generated by the local oscillation LD 32 is uniform, control is performed so that the polarization plane of the local oscillation light coincides with that of the wavelength dispersion measurement light.

Because the other portions are the same as those shown in FIG. 8, their explanations are omitted here.

With the polarization diversity method, after a wavelength dispersion measurement light and a local oscillation light are separated into two orthogonal polarization components, the same polarization components are combined and added.

Figure 10:
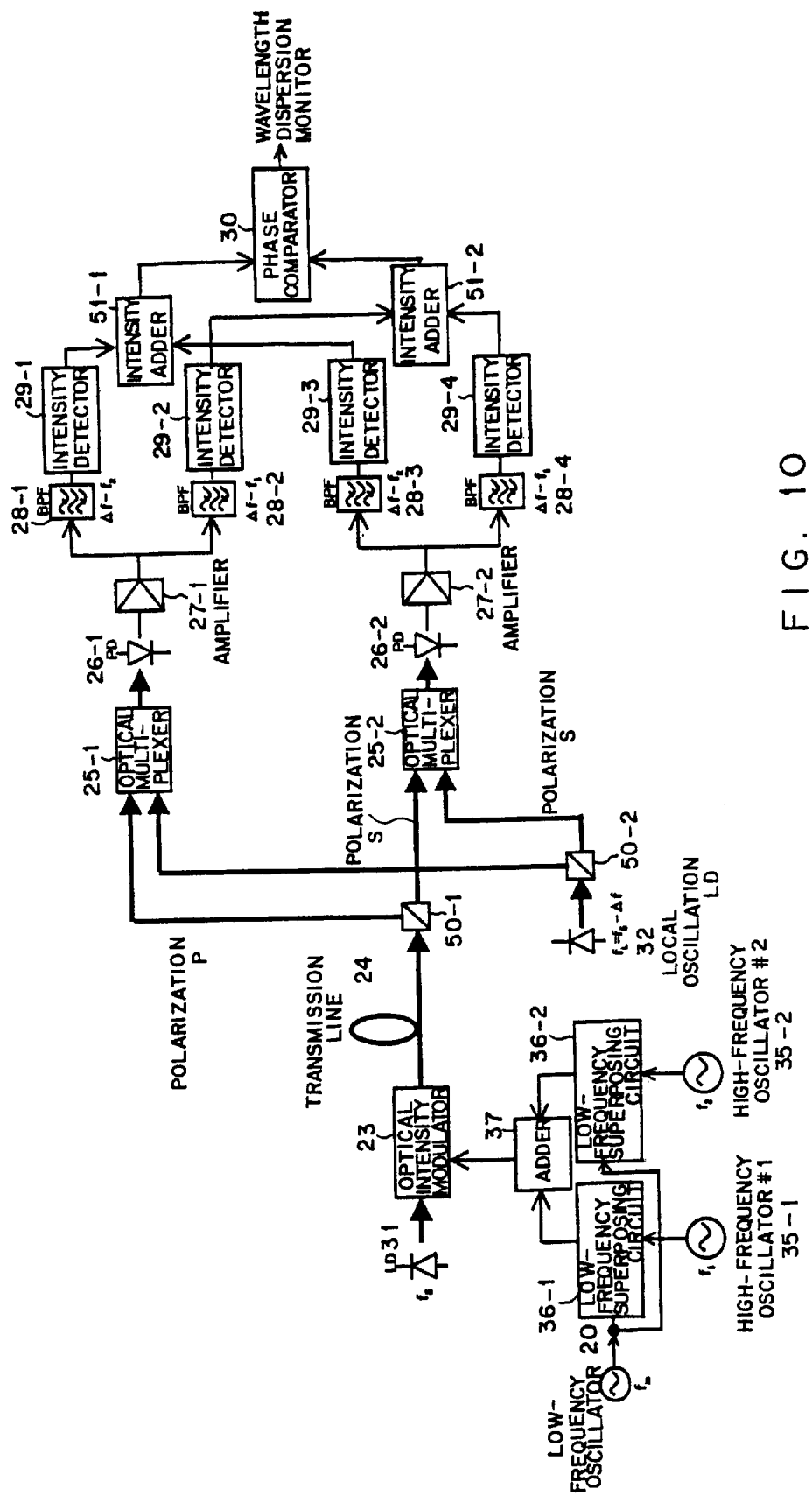
FIG. 10 exemplifies the configuration for heterodyne detection of the wavelength dispersion measuring device according to the preferred embodiment of the present invention (No. 3)

FIG. 10 shows the configuration of the polarization diversity method optimizing the polarization state of a wavelength dispersion measurement light that propagates through a transmission line.

In this figure, the same constituent elements as those shown in FIG. 9 are denoted with the same reference numerals.

A signal having a frequency $f_1$ and a signal having a frequency $f_2$ are respectively output from the high-frequency oscillators #1 35-1 and #2 35-2. A low-frequency signal having a frequency $f_m$ output from the low-frequency oscillator 20 is superposed on these high-frequency signals by the low-frequency superposing circuits 36-1 and 36-2. The signals on which the low-frequency signal is superposed and output from the low-frequency superposing circuits 36-1 and 36-2 are added by the adder 37, and applied to the optical intensity modulator 23 as a modulation signal. To the optical intensity modulator 23, a light having a frequency $f_s$ is input from the LD 31. The intensity of this light is modulated by the modulation signal from the adder 37. In this way, a wavelength dispersion measurement light is transmitted from the optical intensity modulator 23 to the transmission line 24.

The wavelength dispersion measurement light is separated into polarizations P and S by a polarization separator 50-1, and the separated waves are respectively input to optical multiplexers 25-1 and 25-2. Additionally, a local oscillation light output from the local oscillation LD 32 is separated into polarizations P and S by a polarization separator 50-2, and the polarizations are respectively input to the optical multiplexers 25-1 and 25-2.

The polarization P of the wavelength dispersion measurement light and that of the local oscillation light are multiplexed by the optical multiplexer 25-1, whereas the polarization S of the wavelength dispersion measurement light and that of the local oscillation light are multiplexed by the optical multiplexer 25-2. Namely, the same polarizations are coupled, thereby fully combining both of the lights.

Then, the outputs of the optical multiplexers 25-1 and 25-2 are received by PDs 26-1 and 26-2, amplified by amplifiers 27-1 and 27-2, and branched. Next, sideband signals are extracted from the branched signals by bandpass filters 28-1 and 28-3 having a central wavelength $\Delta f-f_2$, and bandpass filters having a central wavelength $\Delta f-f_1$. The intensities of the sideband signals extracted by the bandpass filters 28-1 through 28-4 are detected by intensity detectors 29-1 through 29-4.

Then, the intensities resultant from the detection of the sideband signals in the same frequency bands are added by intensity adders 51-1 and 51-2. That is, in FIG. 10, the detection result of the polarization P and the detection result of the polarization S in the $\Delta f-f_2$ band are added by the intensity adder 51-2, whereas the detection result of the polarization P and the detection result of the polarization S in the $\Delta f-f_1$ band are added by the intensity adder 51-2.

The phase difference between the signals obtained by the intensity adders 51-1 and 51-2 is detected by the phase comparator 30, and this difference is converted into a wavelength dispersion value and output to a wavelength dispersion monitor not shown.

Figure 11:
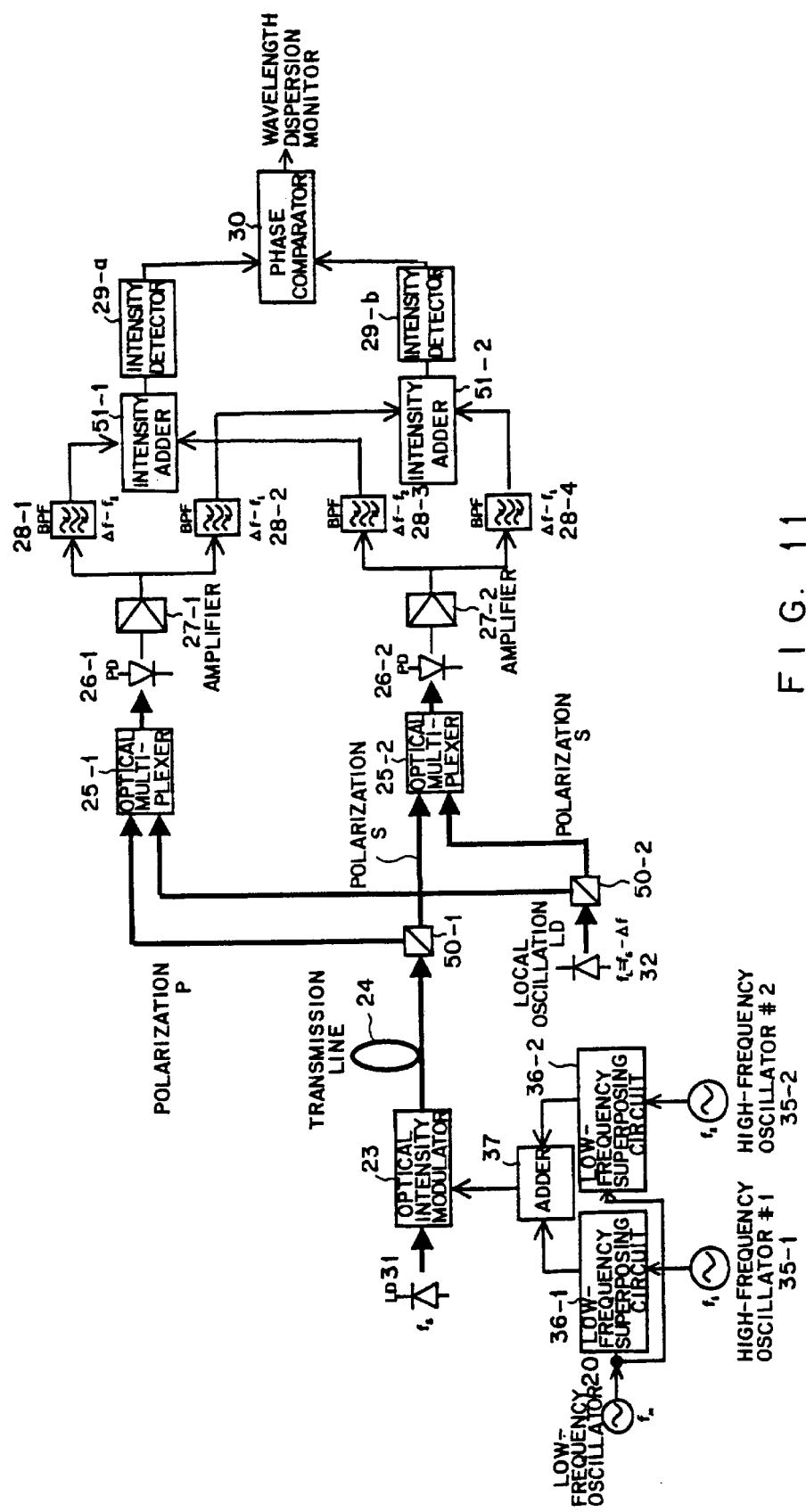
FIG. 11 exemplifies the configuration for heterodyne detection of the wavelength dispersion measuring device according to the preferred embodiment of the present invention (No. 4)

FIG. 11 shows another configuration of the polarization diversity method optimizing the polarization state of a wavelength dispersion measurement light which propagates through a transmission line.

In FIG. 11, the same constituent elements as those shown in FIG. 10 are denoted with the same reference numerals.

In this figure, electric lengths of polarization component signals from the PDs 26-1 and 26-2 to the intensity adders 51-1 and 51-2 must be equalized.

In FIG. 11, sideband signals which are different polarizations from the bandpass filters 28-1 and 28-2 in the same frequency band are added, and the intensity of the added signal is detected by the intensity detector 20-1. Similarly, sideband signals in the same frequency band, but the different polarization from the bandpass filters 28-2 and 28-4 are added with, and the intensity of the added signal is detected by an intensity detector 20-b. Since the intensity detection is made at the stage succeeding the intensity addition, a change in the intensities of the different polarization signals cannot be determined in the same frequency band. Namely, because a phase shift cannot be known, the signals which are the same but have different polarizations are added with their phases shifted, if the electric lengths up to the intensity addition are different depending on a polarization. As a result, the addition cannot be made correctly. Accordingly, the electric lengths must be equalized for different polarizations.

Then, a phase difference is detected from the signals detected by the intensity detectors 29-a and 29-b by a phase detector 30, and a wavelength dispersion value is output to a wavelength dispersion monitor not shown.

If the wavelength dispersion measuring device according to this preferred embodiment is applied to an automatic dispersion compensating system, a variable dispersion compensator arranged in the system is optimally set by using the wavelength dispersion measurement values in FIGS. 8 through 11. If the absolute value of the wavelength dispersion value itself on a transmission line is measured, the wavelength dispersion measurement light is not passed through the variable dispersion compensator within the system, as a wavelength dispersion measurement method at this time.

Figure 12:
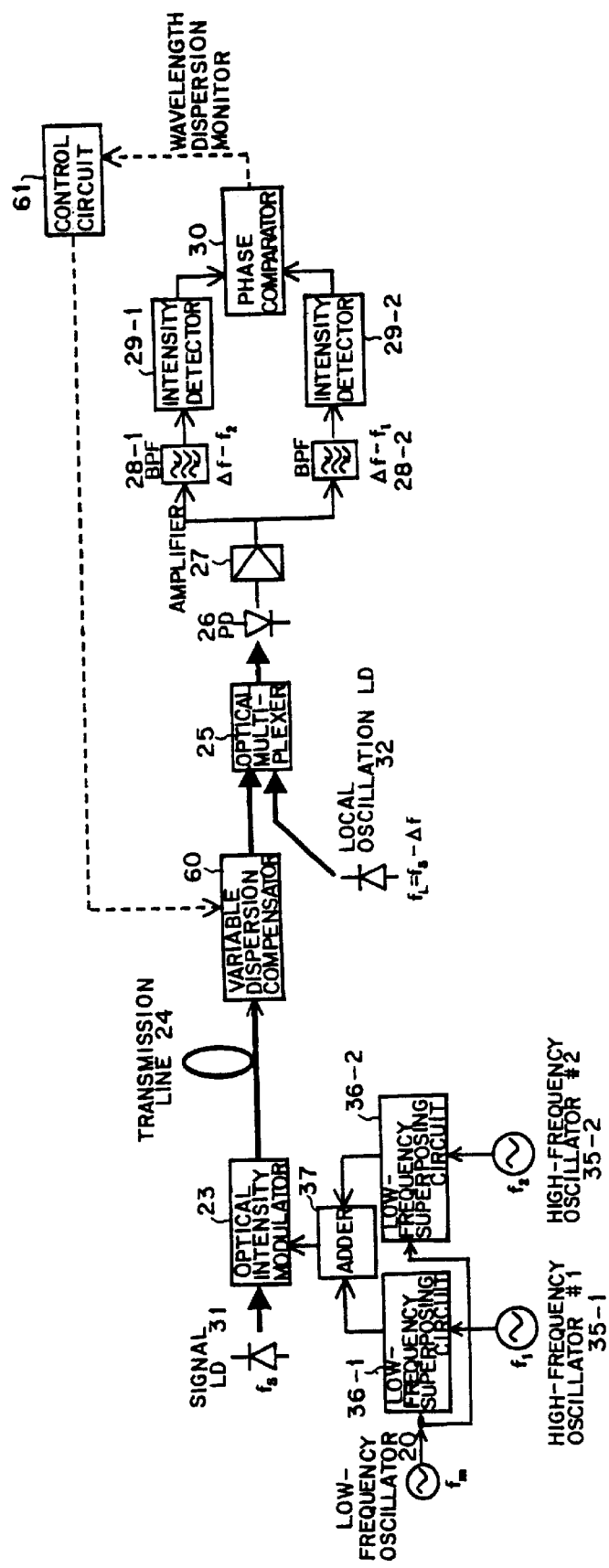
FIG. 12 exemplifies the configuration of an automatic dispersion compensating system that passes a wavelength dispersion measurement light through a variable dispersion compensator, and measures a wavelength dispersion amount after dispersion compensation.

FIG. 12 exemplifies the configuration of an automatic dispersion compensating system which passes a wavelength dispersion measurement light through a variable dispersion compensator, and measures a wavelength dispersion amount after dispersion compensation.

In FIG. 12, the same constituent elements as those shown in FIG. 6 are denoted with the same reference numerals.

If a wavelength dispersion measurement light is not passed through a variable dispersion compensator, the range of wavelength dispersion measurement differs. Therefore, the above described frequency setting values can possibly differ.

The configuration shown in FIG. 12 is based on the configuration shown in FIG. 6 (the configuration of the transmitting side and the BPF frequencies on the receiving side). However, also the configuration shown in FIG. 4 is applicable.

In FIG. 12, a variable dispersion compensator 60 is arranged between the transmission line 24 and the optical multiplexer 60. A wavelength dispersion measurement light is influenced by wavelength dispersion including the wavelength dispersion caused by the variable dispersion compensator 60. Therefore, also the wavelength dispersion value obtained by the phase comparator 30 includes the wavelength dispersion caused by the variable dispersion compensator 60. A control circuit 61 makes a calculation from the wavelength dispersion value obtained by the phase comparator 30 for a control signal to be transmitted to the variable dispersion compensator 60 in order to make the wavelength dispersion value optimum, and controls the variable dispersion compensator 60. In this way, a system automatically compensating for the wavelength dispersion of a transmission line can be configured.

The configuration shown in FIG. 12 does not include the configuration for controlling the polarizations of a local oscillation light and a wavelength dispersion measurement light. The configurations shown in FIGS. 8 through 11 are applicable also the configuration shown in FIG. 12.

As the variable dispersion compensator, a VIPA (Virtually Imaged Phased Array) dispersion compensator (Source: M. Shirasaki et al., "Dispersion Compensation Using the Virtual Imaged Phased Array", APCC/OECC '99 Technical Digest Vol. 2 pp. 1367–370), and a fiber grating dispersion compensator (Source: M. M. Ohn et al., "Tunable Fiber Grating Dispersion Using a Piesoelectric Stack", OFC' Technical Digest WJ3 pp. 155–156) exist.

Exemplified next is the configuration of an automatic dispersion compensating system using the wavelength dispersion measuring device according to the preferred embodiment of the present invention in a WDM (Wavelength Division Multiplexing) system.

Figure 13:
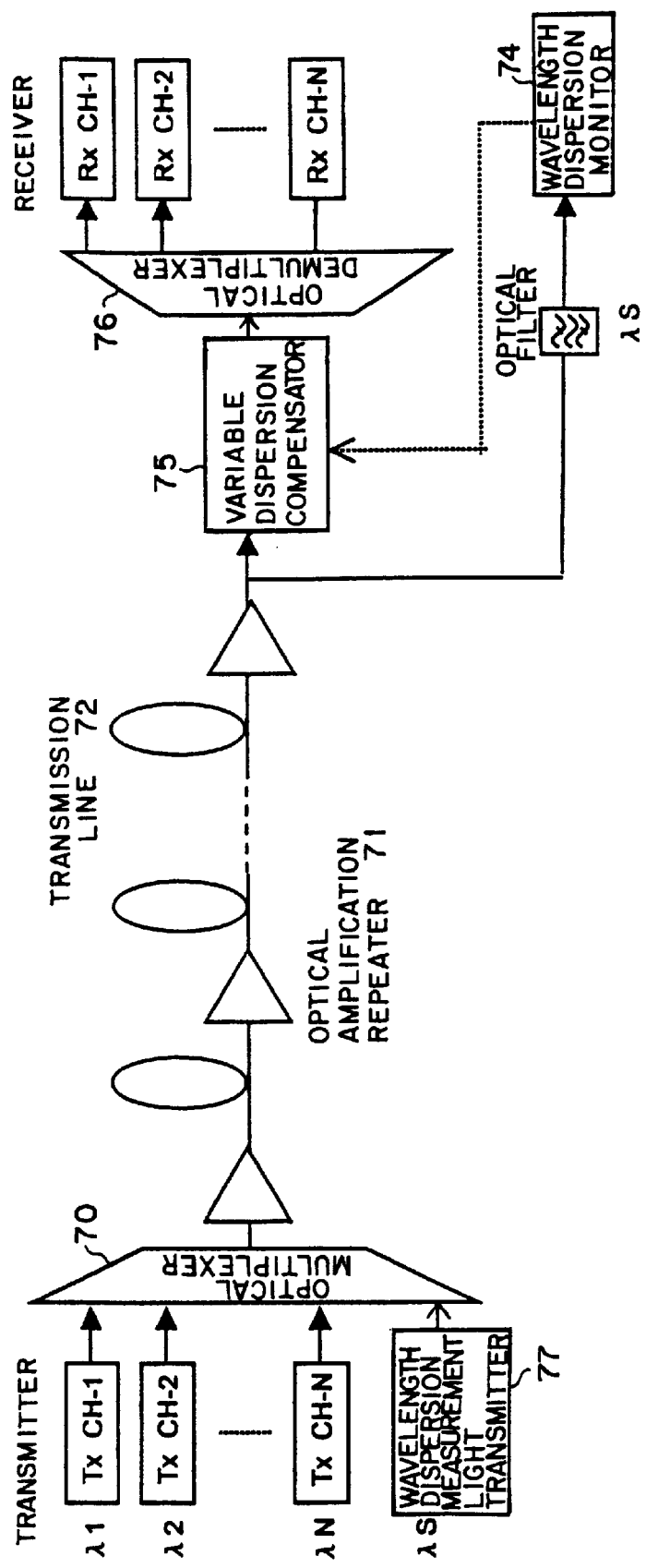
FIG. 13 exemplifies the configuration of an automatic dispersion compensating system in the case where a wavelength dispersion measurement light is not passed through a variable dispersion compensator within the system.

FIG. 13 exemplifies the configuration of an automatic dispersion compensating system in the case where a wavelength dispersion measurement light is not passed through a variable dispersion compensator within the system.

Transmitters Tx CH-1 to Tx CH-N are transmitters transmitting a normal communication signal. These transmitters transmit signals by putting them on wavelengths λ1 to λN. At this time, also the wavelength dispersion light measurement light having a wavelength λs is transmitted from a wavelength dispersion measurement light transmitter 77.

Optical signals from the transmitters Tx CH-1 to Tx CH-N and the light from the dispersion measurement light transmitter 77 are wavelength-multiplexed by an optical multiplexer 70. The wavelength-multiplexed signal is propagated through a transmission line including an optical amplification repeater 71, and optical-branched before the variable dispersion compensator. Only a wavelength dispersion measurement light ($\lambda s = 2\pi c/fs$: c is the speed of light) is extracted from the branched signal by an optical filter 73, and the wavelength dispersion amount of the transmission line itself is measured. Its monitoring information is fed back to the variable dispersion compensator 75 through which the optical signal having CH1 to N pass, so that the wavelength dispersion of the transmission line is compensated. The multiplexed optical signal whose wavelength dispersion is compensated is input to an optical demultiplexer 76, which demultipelxes the multiplexed signal into signals having respective wavelengths. The optical signals having the respective wavelengths are received by corresponding receivers Rx CH-1 to CH-N.

FIG. 14 exemplifies the configuration of an automatic dispersion compensating system in the case where a wavelength dispersion measurement light is passed through a variable dispersion compensator within the system.

In FIG. 14, wavelengths λ1 to λN and λs are allocated to transmitters Tx CH-1 to Tx CH-N and a wavelength dispersion measurement light transmitter 77. Optical signals are output with these wavelengths. An optical multiplexer 70 multiplexes these wavelengths, and generates an optical wavelength-mutiplexed signal to be transmitted to a transmission line 72. The generated optical wavelength-multiplexed signal propagates through the transmission line 72 on which an optical amplification repeater 71 is arranged. The wavelength dispersion of the wavelength-multiplexed signal is compensated, and input to an optical demultiplexer 76. The optical demultiplexer 76 demultiplexes the multiplexed signal into signals having respective wavelengths, and received by receivers Rx CH-1 to CH-N. At the same time, the wavelength dispersion measurement light is input to a wavelength dispersion monitor 74, and a wavelength dispersion value is measured. This measurement value is converted into a control signal for the variable dispersion compensator, which is controlled by this control signal to optimally compensate for the wavelength dispersion of the transmission line.

Normally, the dispersion value of each channel differs depending on the dispersion slope of a transmission line. Therefore, it is important to consider the wavelength dispersion slope in a WDM system. Especially, the faster the transmission speed per channel and the smaller the wavelength dispersion tolerance, the more the strictness of the slope is required.

If many wavelengths are collectively compensated with one variable dispersion compensator as shown in FIGS. 13 and 14, settings including also the dispersion slope compensation must be made. Accordingly, a configuration where a variable dispersion compensator is arranged within each of the receivers (Rx CH-1 to CH-N), and a dispersion compensation amount is individually set is considered as a system which takes the dispersion slope compensation into account.

Figure 15:
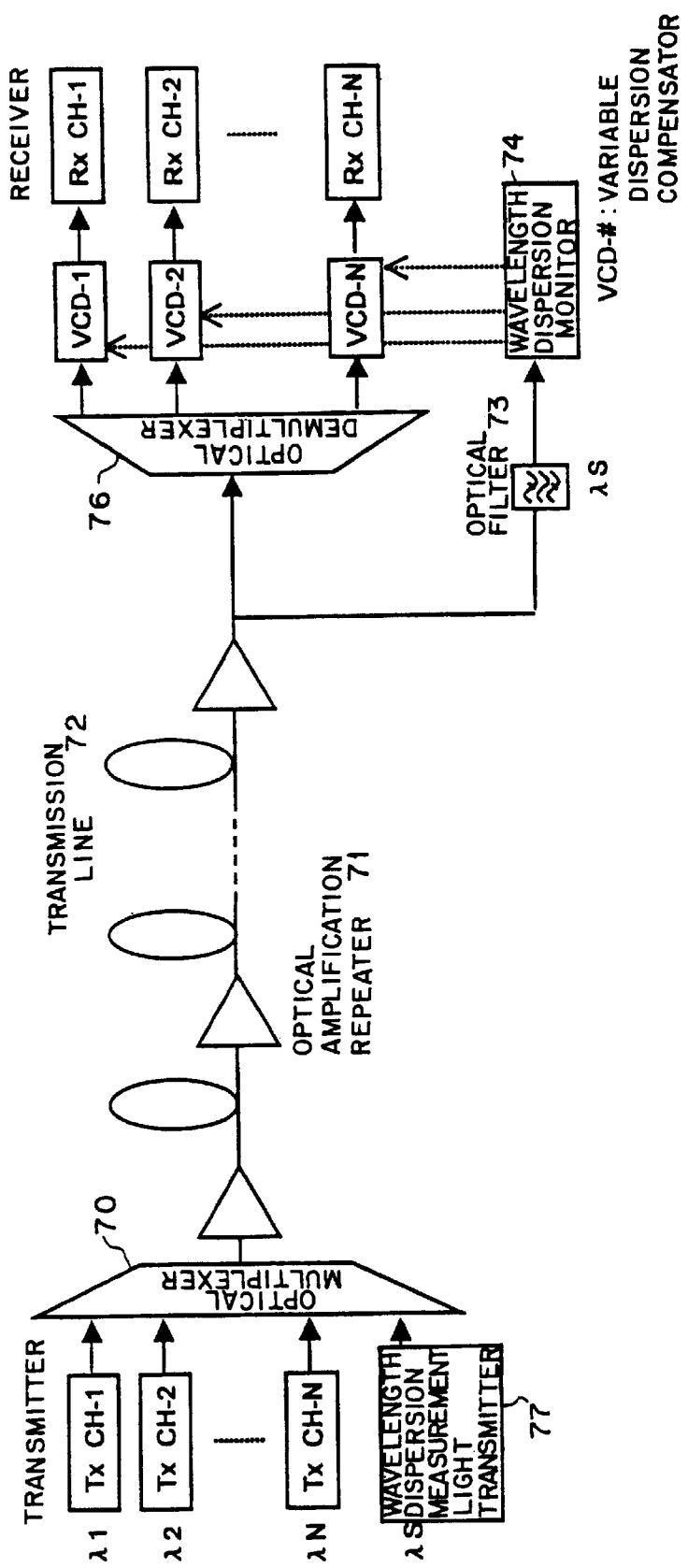
FIG. 15 exemplifies the configuration of an automatic wavelength dispersion compensating system that enables dispersion slope to be compensated.

FIG. 15 exemplifies the configuration of an automatic wavelength dispersion compensating system which enables the dispersion slope compensation.

In this figure, optical signals having wavelengths λ1 to λN and a wavelength dispersion measurement light having a wavelength λs are transmitted from transmitters Tx CH-1 to Tx CH-N and a wavelength dispersion measurement light transmitter 77. These signals are input to an optical multiplexer 70, and multiplexed. The wavelength-multiplexed signal propagates through a transmission line 72 including an optical amplification repeater 71. Part of the wavelength-multiplexed signal is branched before being input to an optical demultiplexer 76. The wavelength dispersion measurement light is extracted by an optical filter 73. Then, a wavelength dispersion value is measured by a wavelength dispersion monitor 74.

In the meantime, the wavelength-multiplexed signal input to the optical demultiplexer 76 is branched into optical signals having respective wavelengths, and input to variable dispersion compensators VCD-1 to VCD-N which are arranged for the respective wavelengths. The wavelength dispersion monitor 74 controls the variable dispersion compensators VCD-1 through VCD-N so that the wavelength dispersion of the respective waves are optimally compensated based on the measured wavelength dispersion value. In this way, the optical signals having the respective wavelengths whose dispersion are compensated are received by receivers Rx CH-1 to CH-N.

In this case, to reflect the influence of the dispersion slope on the wavelength dispersion compensation, it is desirable to allow the wavelength of the wavelength dispersion measurement light to be changed.

Figure 16A:
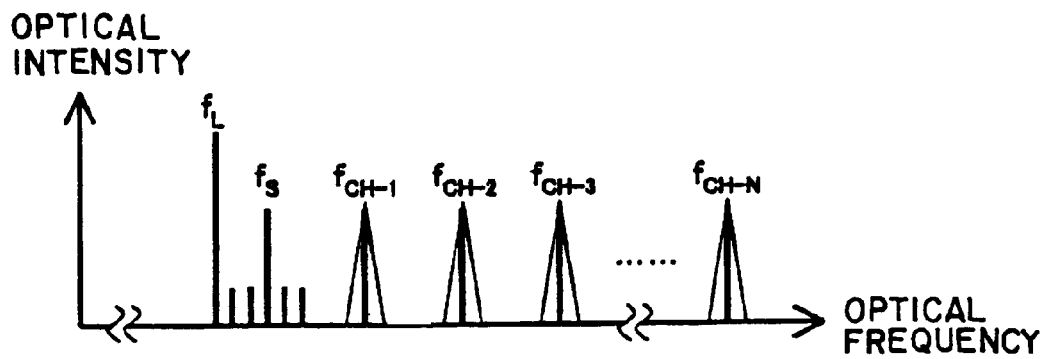
FIGS. 16A and 16B exemplify the allocation of the frequencies of a plurality of signal lights, wavelength dispersion measurement light, and local oscillation light.
Figure 16B:
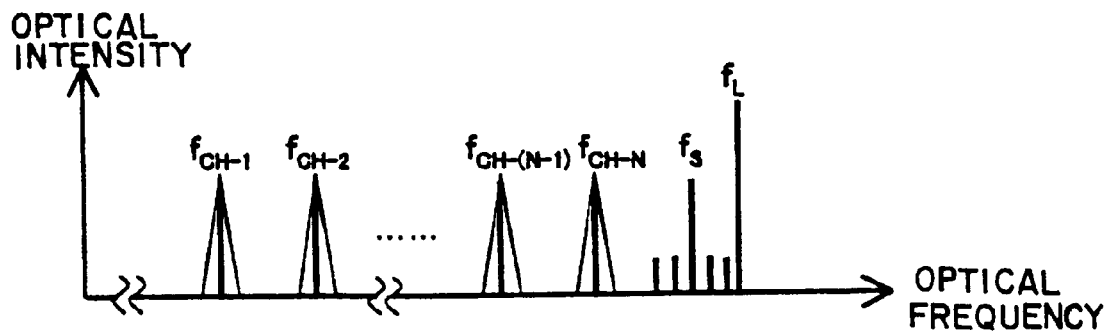

FIGS. 16A and 16B exemplify the frequency allocation of a plurality of signal lights, a wavelength dispersion measurement light, and a local oscillation light in a WDM system.

In this WDM system, one of a plurality of frequencies prepared at predetermined frequency (wavelength) intervals is used as a wavelength dispersion measurement light.

FIG. 16A shows the state of spectrum in the case where the frequency of the wavelength dispersion measurement light is set as a frequency lower than any other signal lights on the low-frequency side, and the local oscillation light is allocated to a further lower frequency on the low-frequency side.

FIG. 16B shows the state of spectrum in the case where the frequency of the wavelength dispersion measurement light is set as a frequency higher than any other signal lights on the high-frequency side, and the local oscillation light is allocated to a further higher frequency on the low-frequency side.

If the wavelength dispersion measuring device according to the preferred embodiments of the present invention is applied to a wavelength multiplexing system, in the heterodyne detection on the receiving side, it is important to suitably set the frequencies of a signal light, a wavelength dispersion measurement light, and a local oscillation light so as not to cause crosstalk with the signal component having a different wavelength when the sideband component of the wavelength dispersion measurement light is extracted by a BPF.

Additionally, the preferred embodiments according to the present invention refer to the use of an optical intensity modulator. As an optical intensity modulator which generates a wavelength dispersion measurement light on a transmitting side, an LiNbO$_3$ Mach-Zehnder modulator exists. As other optical intensity modulators, a field absorbing semiconductor modulator, a Mach-Zehnder semiconductor modulator exist.

To generate the sidebands and the sub-sidebands of the wavelength dispersion measurement light shown in FIGS. 5A and 7A, it is desirable to drive an optical intensity modulator of any type in an area where the voltage-to-optical output characteristic becomes linear.

Although this preferred embodiment does not explain in detail, a fixed dispersion compensator may be arranged within an optical amplification repeater.

According to the present invention, a wavelength dispersion value is measured by using the sideband signal obtained by modulating a transmission light, thereby simplifying the circuit configuration of a wavelength dispersion measuring device. Additionally, since a bandpass filter is used, a limitation is imposed on the frequency range of a received optical light, leading to a reduction in noise produced by light reception. Namely, an optical SNR can be improved.

What is claimed is:

1. A wavelength dispersion measuring device, comprising:
    a modulating unit modulating a light output from a light source;
    a transmitting unit transmitting the modulated light to a transmission line as a wavelength dispersion measurement light;
    a light receiving unit receiving the modulated light which propagates through the transmission line;
    a filter unit extracting a sideband signal from the received modulated light; and
    a phase difference detecting unit detecting a phase difference between different frequency band components of the sideband signal, wherein
        a wavelength dispersion value of the transmission line is calculated from the phase difference, and wherein said light receiving unit comprises
            a local oscillation light generating unit generating a local oscillation light having a predetermined frequency, and
            an optical multiplexing unit multiplexing the local oscillation light with the modulated light; and
            said light receiving unit performs heterodyne detection for the modulated light.

2. A wavelength dispersion measuring device, comprising:
    a modulating unit modulating a light output from a light source;
    a transmitting unit transmitting the modulated light to a transmission line as a wavelength dispersion measurement light;
    a light receiving unit receiving the modulated light which propagates through the transmission line;
    a filter unit extracting a sideband signal from the received modulated light; and
    a phase difference detecting unit detecting a phase difference between different frequency band components of the sideband signal, wherein
        a wavelength dispersion value of the transmission line is calculated from the phase difference, and
        said modulating unit modulates the light by using a signal obtained by superposing an electric signal having a first frequency on an electric signal having a second frequency.

3. A wavelength dispersion measuring device, comprising;
    a modulating unit modulating a light output from a light source;
    a transmitting unit transmitting the modulated light to a transmission line as a wavelength dispersion measurement light;
    a light receiving unit receiving the modulated light which propagates through the transmission line;
    a filter unit extracting a sideband signal from the received modulated light; and
    a phase difference detecting unit detecting a phase difference between different frequency band components of the sideband signal, wherein a wavelength dispersion value of the transmission line is calculated from the phase difference, and said modulating unit modulates the light by using a signal obtained by respectively superposing an electric signal having a third frequency on the signals having the first and the second frequencies.

4. A wavelength dispersion measuring device, comprising:

a modulating unit modulating a light output from a light source;

a transmitting unit transmitting the modulated light to a transmission line as a wavelength dispersion measurement light;

a light receiving unit receiving the modulated light which propagates through the transmission line;

a filter unit extracting a sideband signal from the received modulated light; and a phase difference detecting unit detecting a phase difference between different frequency band components of the sideband signal, wherein a wavelength dispersion value of the transmission line is calculated from the phase difference, a polarization controlling unit controlling polarizations of a local oscillation light and the wavelength dispersion measurement light so that the local oscillation light and the wavelength dispersion measurement light are optimally multiplexed, said light receiving unit comprises a converting unit converting an optical frequency of a modulated light into an electric frequency of an electric signal, and said filter unit extracts a sideband signal of the electric signal.

5. The wavelength dispersion measuring device according to claim 4, wherein said polarization controlling unit changes a polarization of the local oscillation light.

6. The wavelength dispersion measuring device according to claim 4, wherein said polarization controlling unit changes a polarization of the wavelength dispersion measurement light.

7. The wavelength dispersion measuring device according to claim 4, wherein said polarization controlling unit comprises a unit, respectively, separating the local oscillation light and the wavelength dispersion measurement light into orthogonal polarizations, a unit multiplexing same polarization components of the local oscillation light and the wavelength dispersion light, and a unit multiplexing different polarization component signals of the local oscillation light and the wavelength dispersion measurement light.

8. A wavelength dispersion measuring device, comprising;

a modulating unit modulating a light output from a light source;

a transmitting unit transmitting the modulated light to a transmission line as a wavelength dispersion measurement light;

a light receiving unit receiving the modulated light which propagates through the transmission line;

a filter unit extracting a sideband signal from the received modulated light; and a phase difference detecting unit detecting a phase difference between different frequency band components of the sideband signal, wherein a wavelength dispersion value of the transmission line is calculated from the phase difference, a wavelength dispersion compensating unit compensating for wavelength dispersion of a transmission line based on the wavelength dispersion value, and the wavelength dispersion value is calculated by passing the wavelength dispersion measurement light through said wavelength dispersion compensating unit.

9. A wavelength dispersion measuring device applied to a wavelength division multiplexing system, comprising:

a modulating unit modulating a light output from a light source;

a transmitting unit transmitting the modulated light to a transmission line as a wavelength dispersion measurement light;

a light receiving unit receiving the modulated light which propagates through the transmission line;

a filter unit extracting a sideband signal from the received modulated light; and a phase difference detecting unit detecting a phase difference between different frequency band components of the sideband signal, wherein a wavelength dispersion value of the transmission line is calculated from the phase difference, and the wavelength dispersion measurement light is put on a predetermined wavelength stipulated by the wavelength division multiplexing system.

10. The wavelength dispersion measuring device according to claim 9, wherein the wavelength dispersion measurement light is set as a shortest wavelength among wavelengths stipulated in the wavelength division multiplexing system.

11. The wavelength dispersion measuring device according to claim 9, wherein the wavelength dispersion measurement light is set as a longest wavelength among wavelengths stipulated in the wavelength division multiplexing system.

12. A wavelength dispersion measuring method, comprising;

modulating a light output from a light source;

transmitting the modulated light to a transmission line as a wavelength dispersion measurement light;

receiving the modulated light which propagates through the transmission line;

extracting a sideband signal from the received modulated light;

detecting a phase difference between different frequency band components of the sideband signal, wherein a wavelength dispersion value of the transmission line is calculated from the phase difference;

generating a local oscillation light having a predetermined frequency; and performing heterodyne detection for the modulated light in the receiving.

13. The wavelength dispersion measuring method according to claim 12, wherein the light is modulated by using a signal obtained by superposing an electric signal having a first frequency on an electric signal having a second frequency in the modulating.

14. A wavelength dispersion measuring method, comprising;

modulating a light output from a light source;

transmitting the modulated light to a transmission line as a wavelength dispersion measurement light;

receiving the modulated light which propagates through the transmission line;

extracting a sideband signal from the received modulated light; and detecting a phase difference between different frequency band components of the sideband signal, wherein
a wavelength dispersion value of the transmission line is calculated from the phase difference, and
the light is modulated by using a signal obtained by superposing an electric signal having a third frequency on electric signals having first and second frequencies in the modulating.

15. A wavelength dispersion measuring method, comprising:

modulating a light output from a light source;

transmitting the modulated light to a transmission line as a wavelength dispersion measurement light;

receiving the modulated light which propagates through the transmission line;

extracting a sideband signal from the received modulated light;

detecting a phase difference between different frequency band components of the sideband signal, wherein a wavelength dispersion value of the transmission line is calculated from the phase difference; and controlling polarizations of a local oscillation light and the wavelength dispersion measurement light so that the local oscillation light and the wavelength dispersion measurement light are optimally multiplexed.

16. The wavelength dispersion measuring method according to claim 15, wherein
a polarization of the local oscillation light is changed in the controlling.

17. The wavelength dispersion measuring method according to claim 15, wherein
a polarization of the wavelength dispersion measurement light is changed in the controlling.

18. The wavelength dispersion measuring method according to claim 15, wherein
the controlling comprises
separating the local oscillation light and the wavelength dispersion measurement light into orthogonal polarizations,
multiplexing same polarization components of the local oscillation light and the wavelength dispersion light, and
multiplexing different polarization component signals of the local oscillation light and the wavelength dispersion measurement light.

19. A wavelength dispersion measuring method applied to a wavelength division multiplexing system, comprising;

modulating a light output from a light source;

transmitting the modulated light to a transmission line as a wavelength dispersion measurement light;

receiving the modulated light which propagates through the transmission line;

extracting a sideband signal from the received modulated light; and detecting a phase difference between different frequency band components of the sideband signal, wherein
a wavelength dispersion value of the transmission line is calculated from the phase difference, and
the wavelength dispersion measurement light is put on a predetermined wavelength stipulated by the wavelength division multiplexing system.

20. The wavelength dispersion measuring method according to claim 19, wherein
the wavelength dispersion measurement light is set as a shortest wavelength among wavelengths stipulated in the wavelength division multiplexing system.

21. The wavelength dispersion measuring method according to claim 19, wherein
the wavelength dispersion measurement light is set as a longest wavelength among wavelengths stipulated in the wavelength division multiplexing system.

* * * * *